May 22, 1951 C. B. HATFIELD 2,553,581
COMBINATION AUTOMATIC WASHING MACHINE AND DRIER
Filed July 17, 1946 13 Sheets-Sheet 2
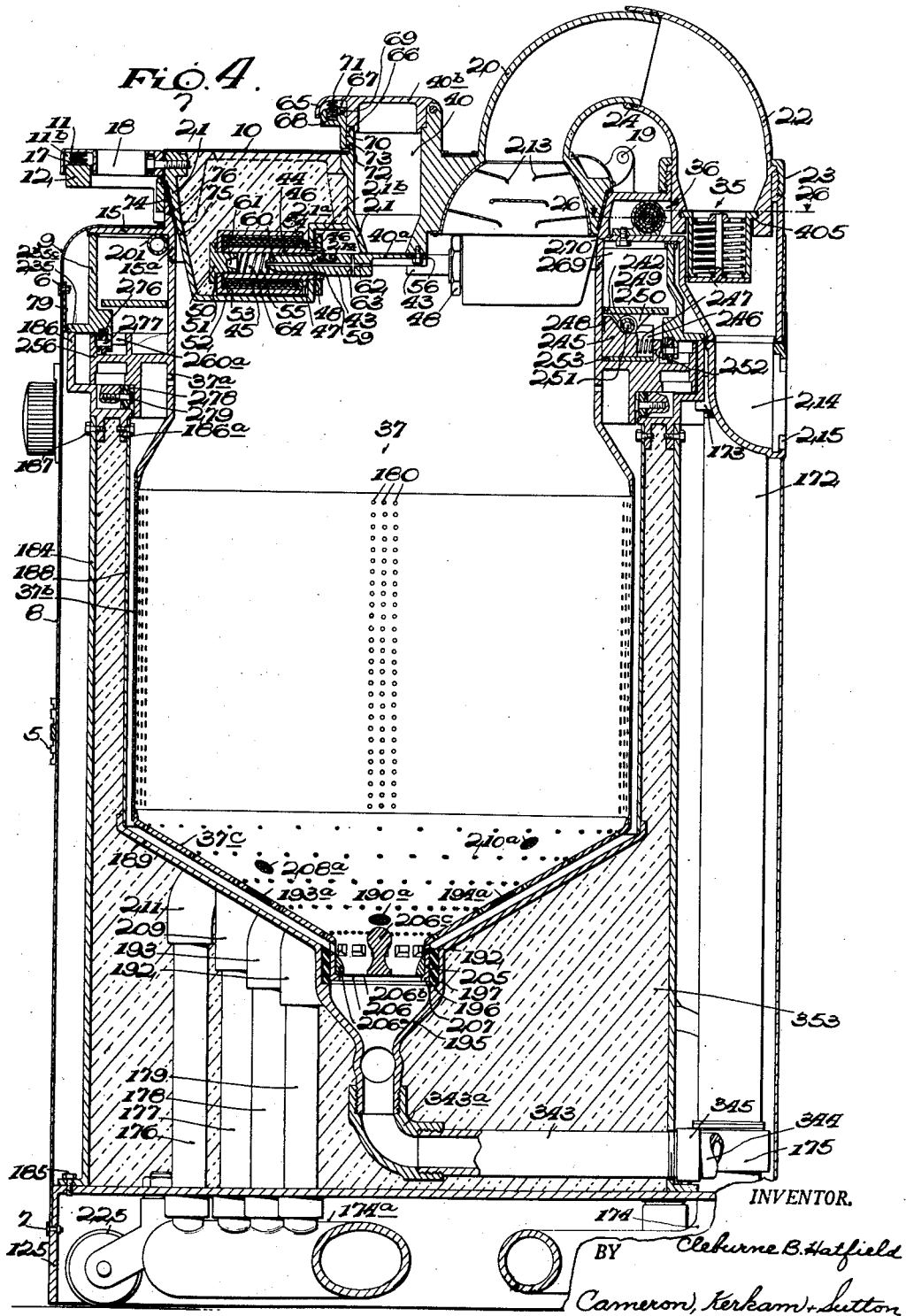
INVENTOR.
Cleburne B. Hatfield
BY
Cameron, Kerkam + Sutton May 22, 1951 — C. B. HATFIELD — 2,553,581
COMBINATION AUTOMATIC WASHING MACHINE AND DRIER
Filed July 17, 1946 — 13 Sheets-Sheet 3

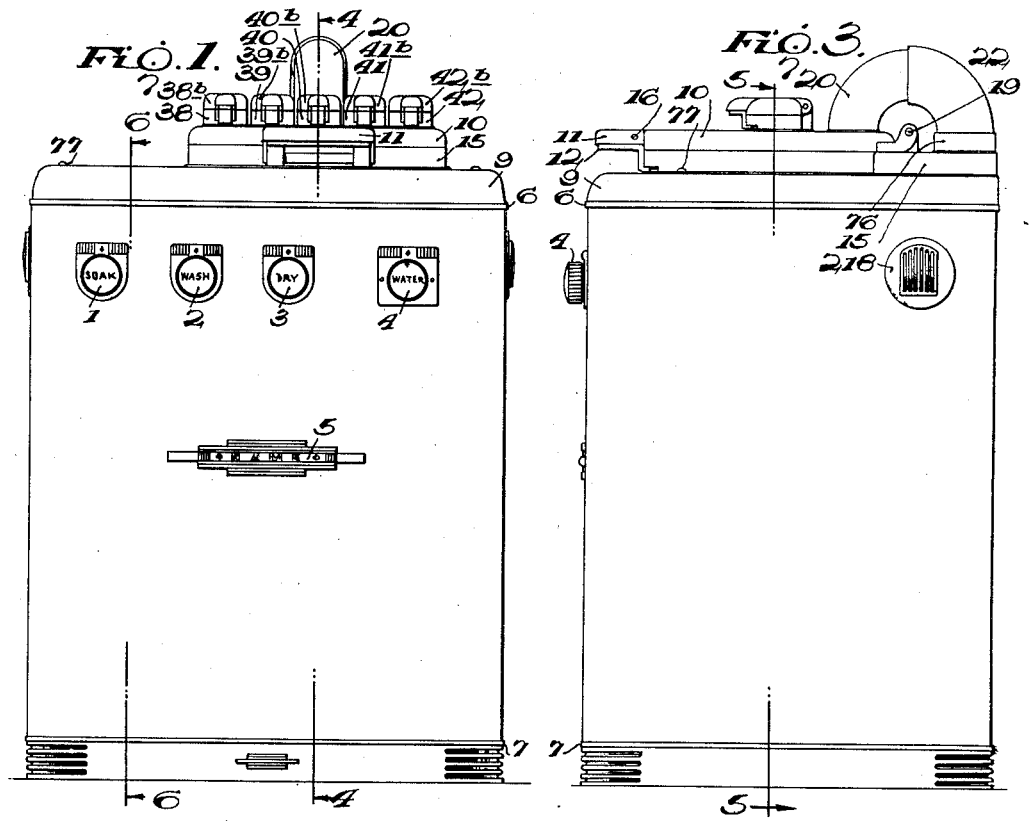
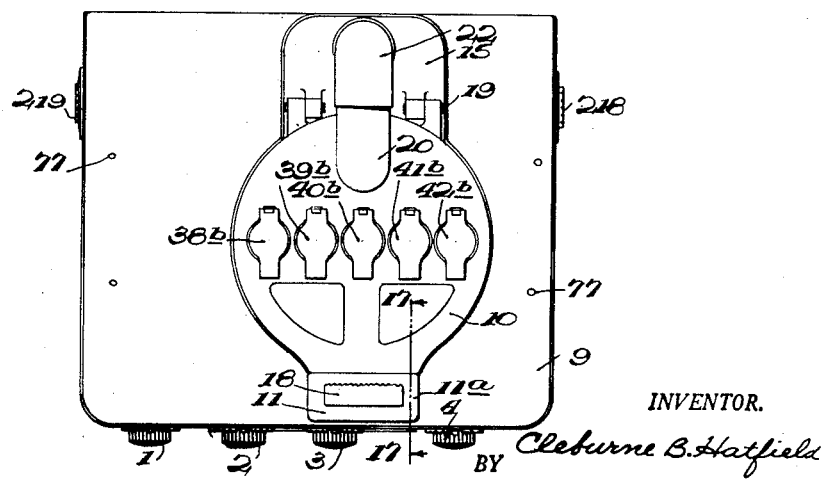

INVENTOR.
Cleburne B. Hatfield
Cameron, Kerkam & Sutton
Attorneys

May 22, 1951 C. B. HATFIELD 2,553,581
COMBINATION AUTOMATIC WASHING MACHINE AND DRIER
Filed July 17, 1946 13 Sheets-Sheet 4

INVENTOR.
Cleburne B. Hatfield
BY
Cameron, Kerkam & Sutton
Attorneys

May 22, 1951   C. B. HATFIELD   2,553,581
COMBINATION AUTOMATIC WASHING MACHINE AND DRIER
Filed July 17, 1946   13 Sheets-Sheet 6

INVENTOR.
Cleburne B. Hatfield
BY
Cameron, Kerkam & Sutton
Attorneys

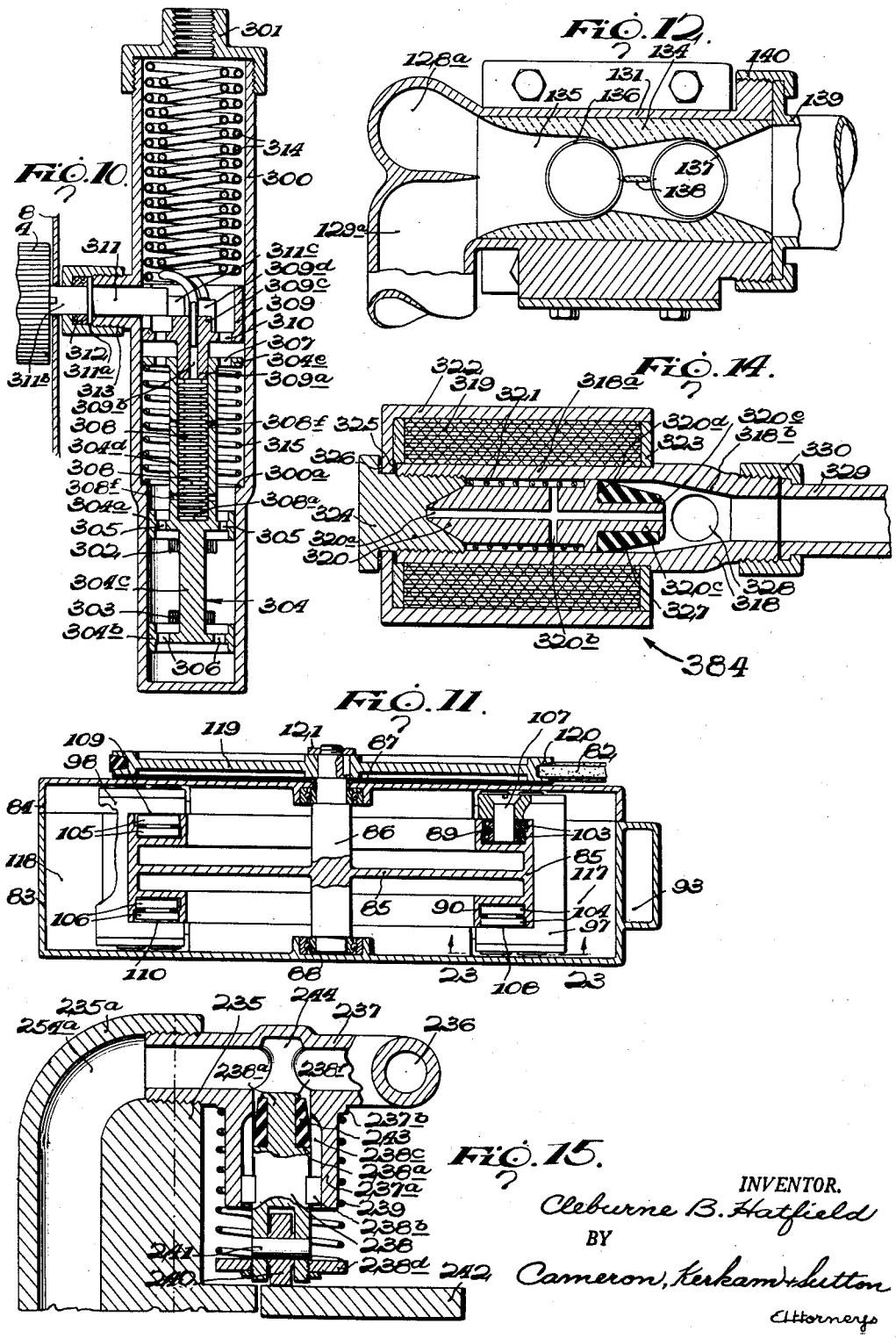

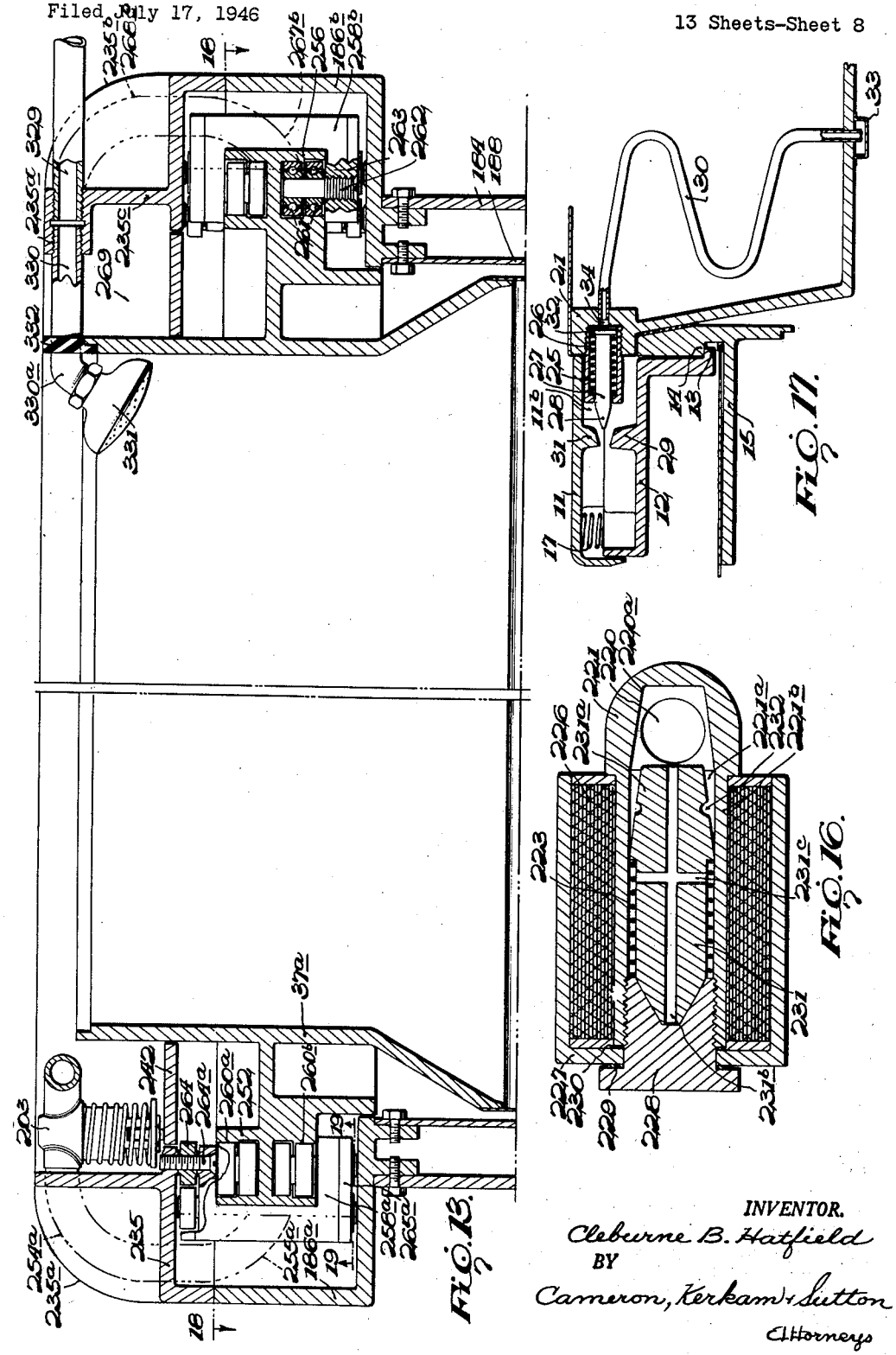

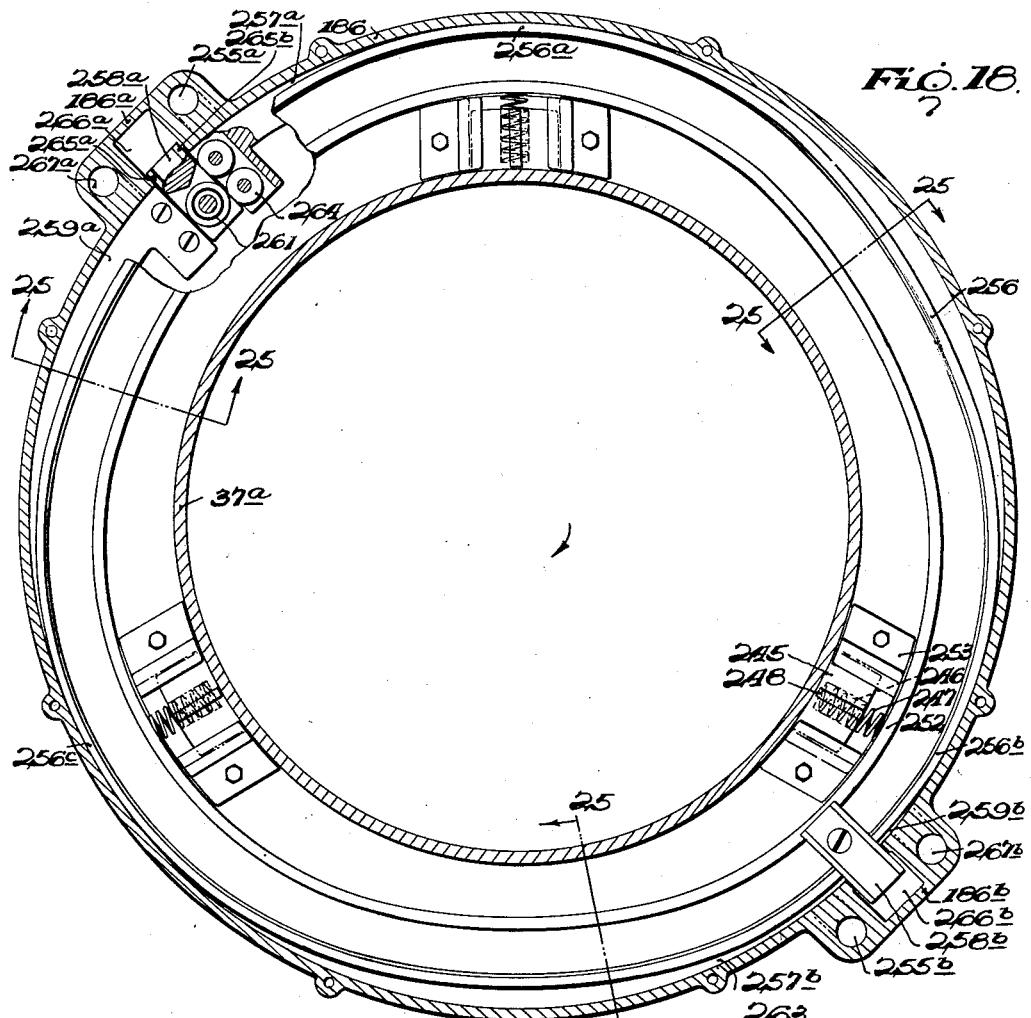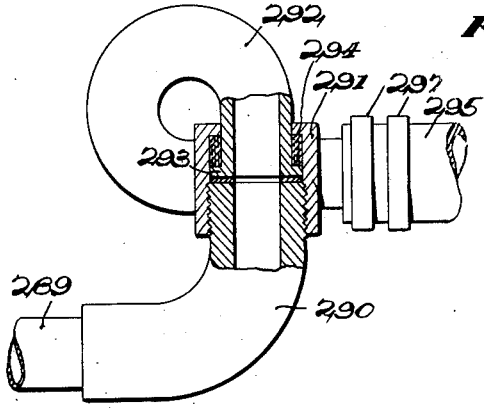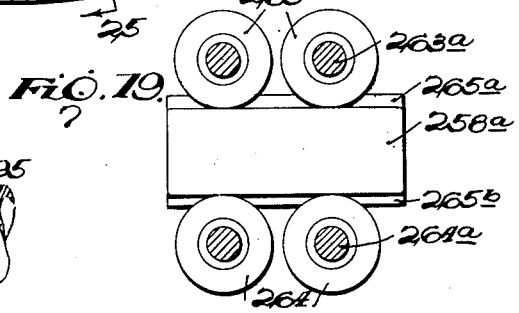

May 22, 1951 C. B. HATFIELD 2,553,581
COMBINATION AUTOMATIC WASHING MACHINE AND DRIER
Filed July 17, 1946 13 Sheets-Sheet 10
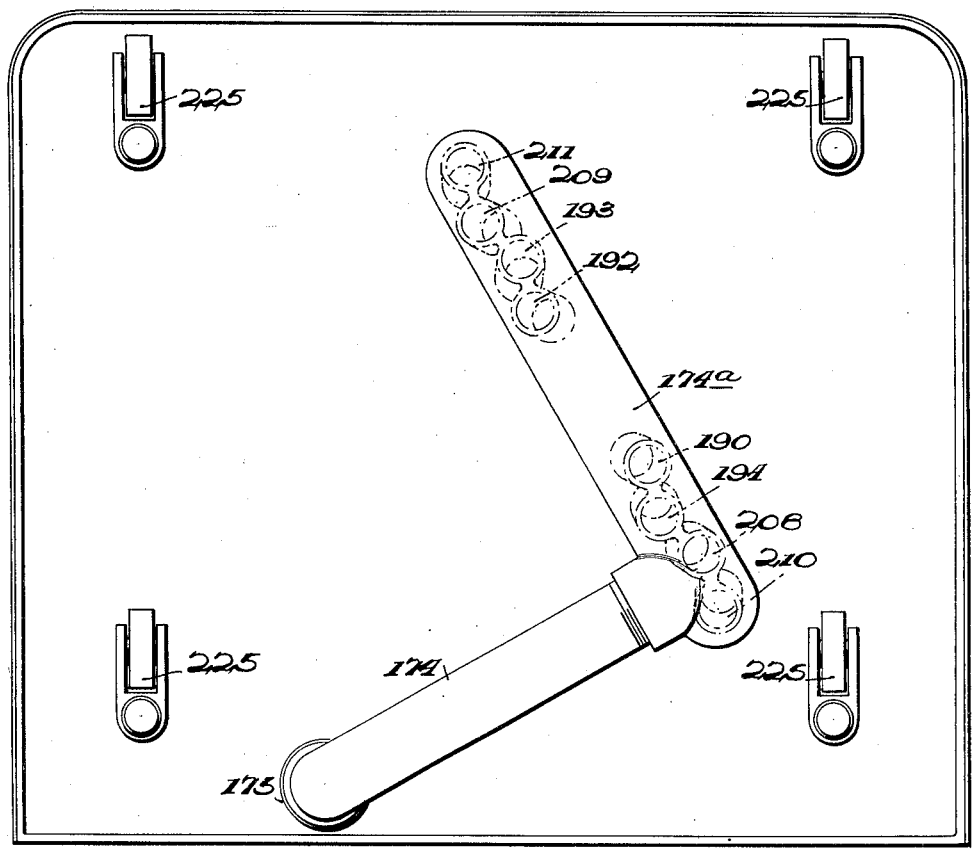
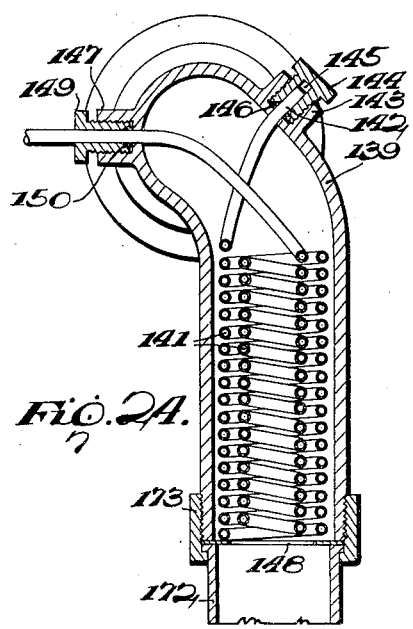
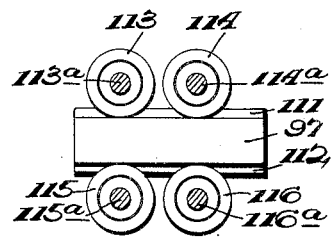
INVENTOR.
Cleburne B. Hatfield
BY
Cameron, Kerkam & Sutton
Attorney

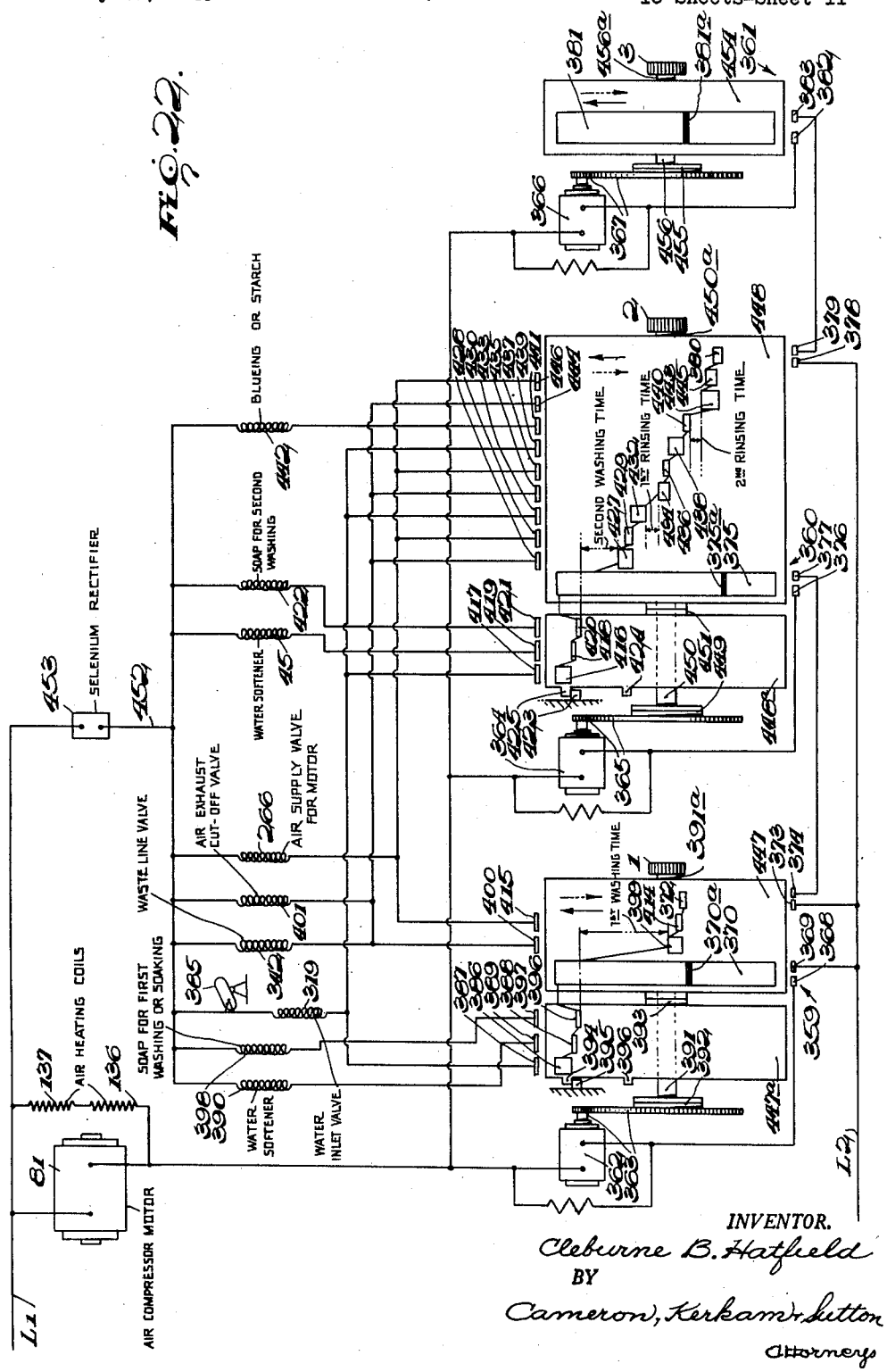

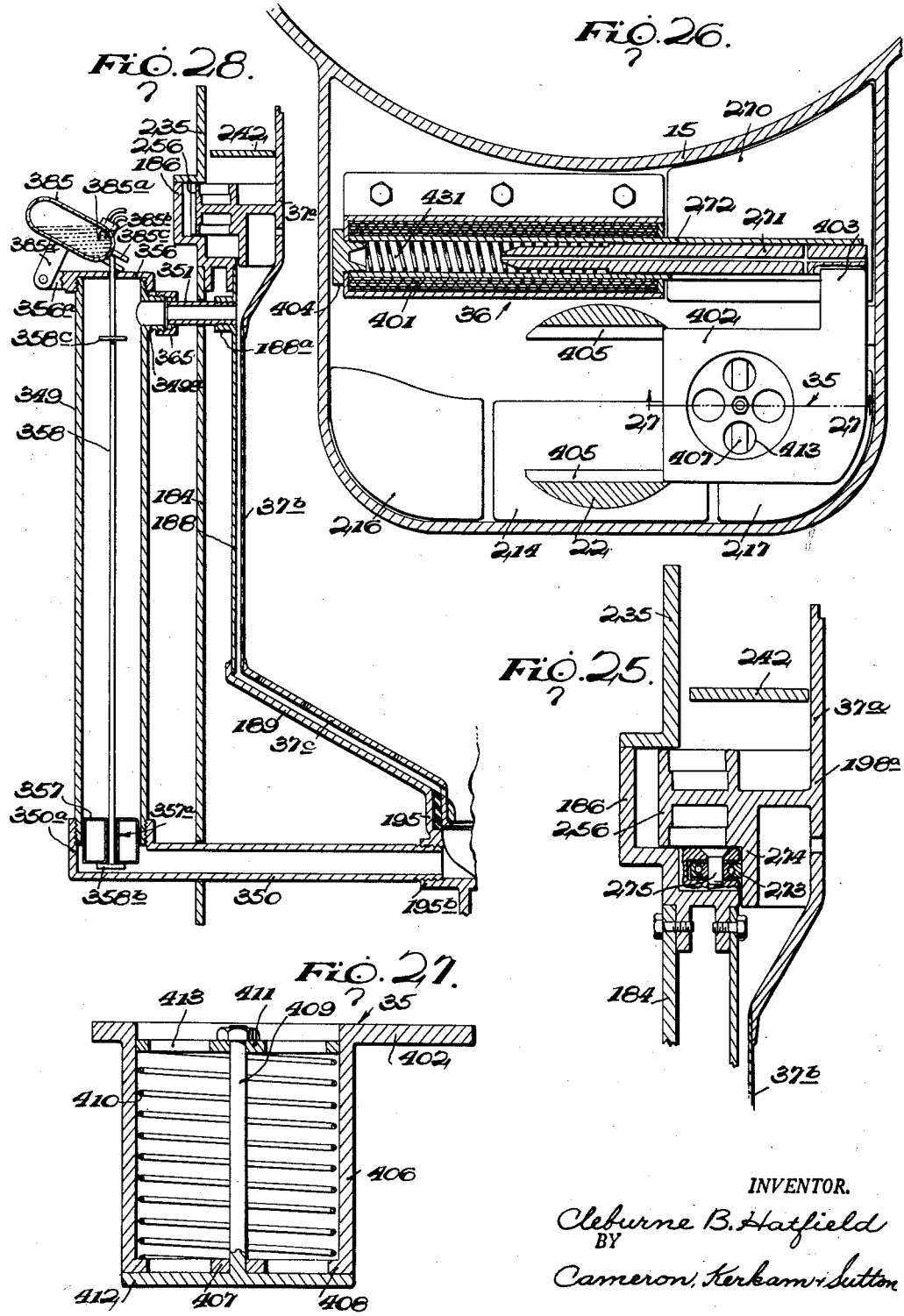

May 22, 1951   C. B. HATFIELD   2,553,581
COMBINATION AUTOMATIC WASHING MACHINE AND DRIER
Filed July 17, 1946   13 Sheets-Sheet 13

INVENTOR.
Cleburne B. Hatfield
Cameron, Kirkam & Sutton
Attorneys

Patented May 22, 1951

2,553,581

UNITED STATES PATENT OFFICE 2,553,581

COMBINATION AUTOMATIC WASHING MACHINE AND DRIER

Cleburne B. Hatfield, Cookeville, Tenn.

Application July 17, 1946, Serial No. 684,119

23 Claims. (Cl. 68—12)

This invention relates to washing machines, and more particularly to a domestic washing machine of the automatic type which is adapted to both wash and dry clothes in the same apparatus.

One of the objects of the present invention is to provide a combination washing machine and drier of new and improved construction which is capable of carrying out a sequence of washing and drying operations in a completely automatic manner, the number and duration of the various operations in the sequence being variable at the will of the user of the machine.

With the machine of the present invention, the user may elect, by a simple setting of dials, whether one or two soaping processes are employed, how many minutes are allowed for each soaping process, and the number of minutes allowed for the drying step, the duration of which latter step may be so selected that the clothes may be either completely dried, or partially dried to any desired degree. After the user has indicated the desired sequence of operations by setting of the dials, the machine is adapted to automatically carry out the wishes of the user in successive operations, including all other related operations such as dumping in the soap, filling with water, emptying of waste liquid, and the like.

Another object of the invention is to provide a washing machine and drier which is extremely simple to use and operate, and wherein the clothes can be inserted, soap and other ingredients placed in appropriate receptacles and the dials set for the desired operations in approximately two minutes, whereafter the machine will perform the desired cycle of operations with no further attention required, and, when the cycle is completed, will stop automatically. Due to the completely automatic character of the machine of the present invention, the user may load the machine with the clothes to be washed, the soap and other desired washing and rinsing ingredients, set the dials, leave home, and upon returning hours later, find the clothes completely washed and dried, ready for ironing.

A further object of the invention is to provide a machine of the character described wherein novel means are employed for utilizing pneumatic pressure to drive a rotatable clothes-containing basket or spinner at a relatively low speed during the major portions of the washing, rinsing and drying operations, and at a relatively high speed during the shorter periods when the clothes are wrung or damp-dried by centrifugal action, thereby eliminating the use of gears and clutch mechanisms for power transmission and the consequent wear of mechanical parts and necessity for lubrication thereof. There is also provided a novel form of governor for controlling the speed at which the basket is rotated and preventing it from "running away" during the periods of high speed operation.

Another object is to provide a washing machine wherein compressed air is utilized in a unique manner for agitation of the clothes and water in a rotating basket, the air being delivered upwardly through novelly arranged ports in the bottom of the basket in relatively strong, short, pulsating blasts.

According to the invention, a plurality of ports are opened or uncovered in pairs, each pair being symmetrically arranged with respect to the axis of rotation of the basket so as to provide for equalization of pressures, and being directed upwardly at selected angles with respect to the perpendicular such that the blasts alternately lead or lag with respect to the direction of rotation of the basket, and are also alternately directed toward and away from the axis of rotation. The strong, rapid, pulsating pneumatic agitation of the contents of the basket thus produced provides a more thorough, vigorous and efficient washing action than machines employing mechanical agitators, and at the same time substantially reduces wear and tear of the clothes, and the formation of lint, in comparison with that resulting from mechanical agitation. By utilizing air under considerable pressure for the pneumatic agitation, and by supplying the air through a plurality of ports at different distances from, and at different angles with respect to, the axis of rotation of the basket, billowing and bunching of the clothes are substantially prevented.

Still another object of the invention is to provide a machine of the character described wherein air is used for drying the clothes, as well as for agitation during the washing operation, and wherein novel means are provided for heating the air and automatically controlling the temperature thereof. The air heating means and its thermostatic control are arranged in a unique manner to effect a most efficient utilization of electrical energy for heating, and a highly accurate, sensitive control of the temperature to which the air is heated.

A still further object is to provide a washing machine for ordinary domestic use which will operate reliably for an indefinite time without the necessity for lubrication, this object being attained by the elimination of gearing and clutches, and by the use of non-corrosive bearings permanently packed with a water-repellent grease at those places where bearings are required.

Another object is to substantially eliminate the necessity for maintenance, repairs and upkeep by minimizing the number of moving parts embodied in the machine, and by the general simplicity and sturdiness of its construction. Furthermore, the construction, shape and relationship of the parts, and the manner in which they are secured together, are such that the machine may be assembled and disassembled with a minimum expenditure of time and labor, while various subassemblies thereof may be readily removed and replaced as units without disturbing the rest of the machine.

Another object of the invention is to provide a simple, unique and troubleproof type of solenoid operated valve for the air, water and waste lines of a washing machine of the character described, which valve is characterized by the inclusion of a spring loaded, solenoid operated plunger having a stopper type nose which moves with a straight linear motion transversely across the line of flow, the plunger being surrounded by, or "floating" in, the fluid medium which it controls.

Another object is to provide a water mixer and temperature regulator of simple and novel construction which is particularly well adapted for use in a washing machine of the character described, and wherein the temperature of the mixed water may be readily adjusted by means of a knob located on the outside of the machine casing.

A further object of the invention is to provide simple and novel means for emptying waste liquid from a washing machine to a level higher than that of the machine itself by use of the same air as that used for agitating the clothes and driving the basket.

A further object is to provide a machine of the character described which is equally suitable for either permanent installation with fixed plumbing connections, or for portable use and temporary connection to hot and cold water lines and a means of waste disposal. To this end, the machine embodies a unique arrangement of flexible hose lines for the supply of hot and cold water and the disposal of waste, which hoses are mounted on drums or reels within the cabinet of the machine in such a manner that the water or waste may run freely through the hoses even though they are only partially unrolled from the reels.

Another object is to provide novel means for enabling the exhaust of used air from the machine at any one of a plurality of different points depending upon the location and character of the installation of the machine, including the provision of a suitable discharge hose which may be connected to the desired exhaust opening in the machine casing and led to a window or other means for permitting the air to escape from the room in which the machine is used.

Still another object of the invention is to provide a washing machine of the character described with a plurality of containers for soap, water softener, blueing or other ingredients which are so constructed that the contents thereof are automatically delivered into the washing water at the proper times in the cycle of operation.

A still further object is to provide an improved lid for the tub of a washing machine which is readily opened and closed to permit the deposit or removal of clothes, and when fastened in closed position, provides a completely air-tight and water-tight closure which prevents the escape of soap bubbles and will effectively maintain the increased air pressure which is required for emptying the waste liquid to a higher level than that of the machine. To this end, the lid embodies a pressure operated plunger which locks the lid latch in closed position during the times in the cycle of operation when waste fluid is being ejected by air pressure, thereby preventing accidental release of the latch by the operator when the upper portion of the tub is filled with compressed air which would forcibly throw open the lid and possibly injure the user.

Another object of the invention is to provide a combined washing machine and drier which, by virtue of the novel construction, arrangement and cooperation of its parts, occupies a relatively small area of floor space, on the order of four square feet, and is so proportioned and shaped as to enable it to fit neatly into the usual arrangement of household appliances and furniture in the home. For example, in the preferred form of the invention, the top of the cabinet is the same height from the floor as that of the standard kitchen sink, while its depth, or distance from front to back, is the same as that of the lower portion of the standard kitchen cabinet. Consequently, the machine of the present invention is particularly well adapted for permanent installation in the modern planned type of kitchen.

Another object is to provide a machine of the character described wherein the parts are of such number, construction and shape that many of them may be successfully and economically manufactured by stamping or die casting processes, and the entire machine may be assembled and completely manufactured at a relatively low cost.

Another object of the invention is to provide an automatic combination washing machine and drier which will encompass in a single device all of the advantages heretofore severally claimed by similar machines known to the art, which attains those advantages in a structurally simple, sturdy and reliable apparatus embodying a minimum of moving parts, and which is superior in its performance, particularly in the completeness of the drying possible of attainment, to devices of the same general character heretofore available for household use.

These and other objects, including the provision of a novel form of governor control for the basket driving air motor and a unique system of automatic electrical control for the various operations performed by the machine, will appear more fully upon consideration of the detailed description of the embodiment of the invention which follows. Although only one specific form of machine is described and illustrated in the accompanying drawings, it is to be expressly understood that these drawings are for the purpose of illustration only, and are not to be construed as defining the scope of the invention, for which latter purpose reference should be had to the appended claims.

Reference now to the drawings, wherein like reference characters indicate like parts throughout the several views:

Fig. 1 is a front elevation of one form of automatic washing and drying machine embodying the present invention.

Figs. 2 and 3 are a top and a side view, respectively, of the machine shown in Fig. 1.

Figure 5:
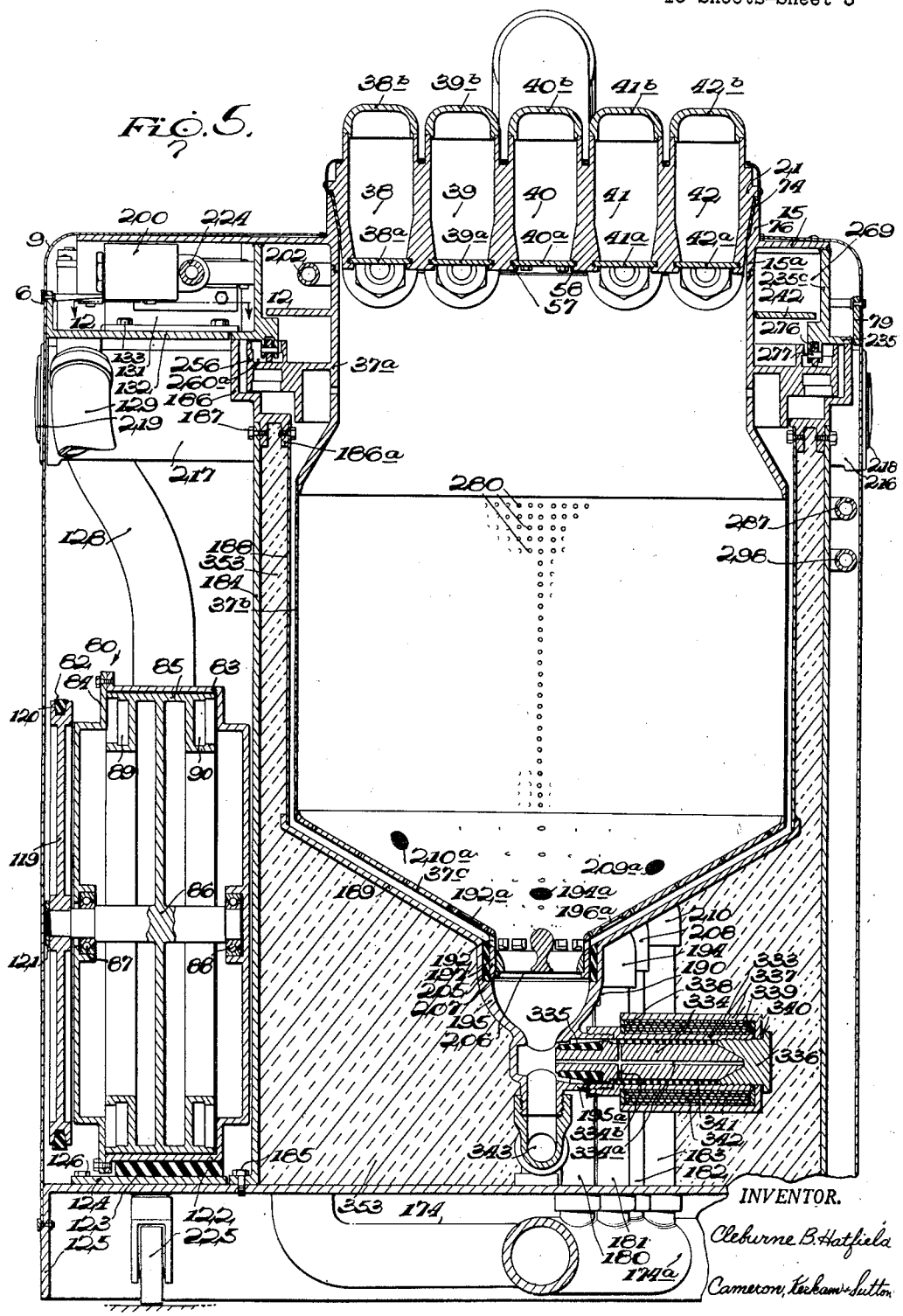
Figure 6:
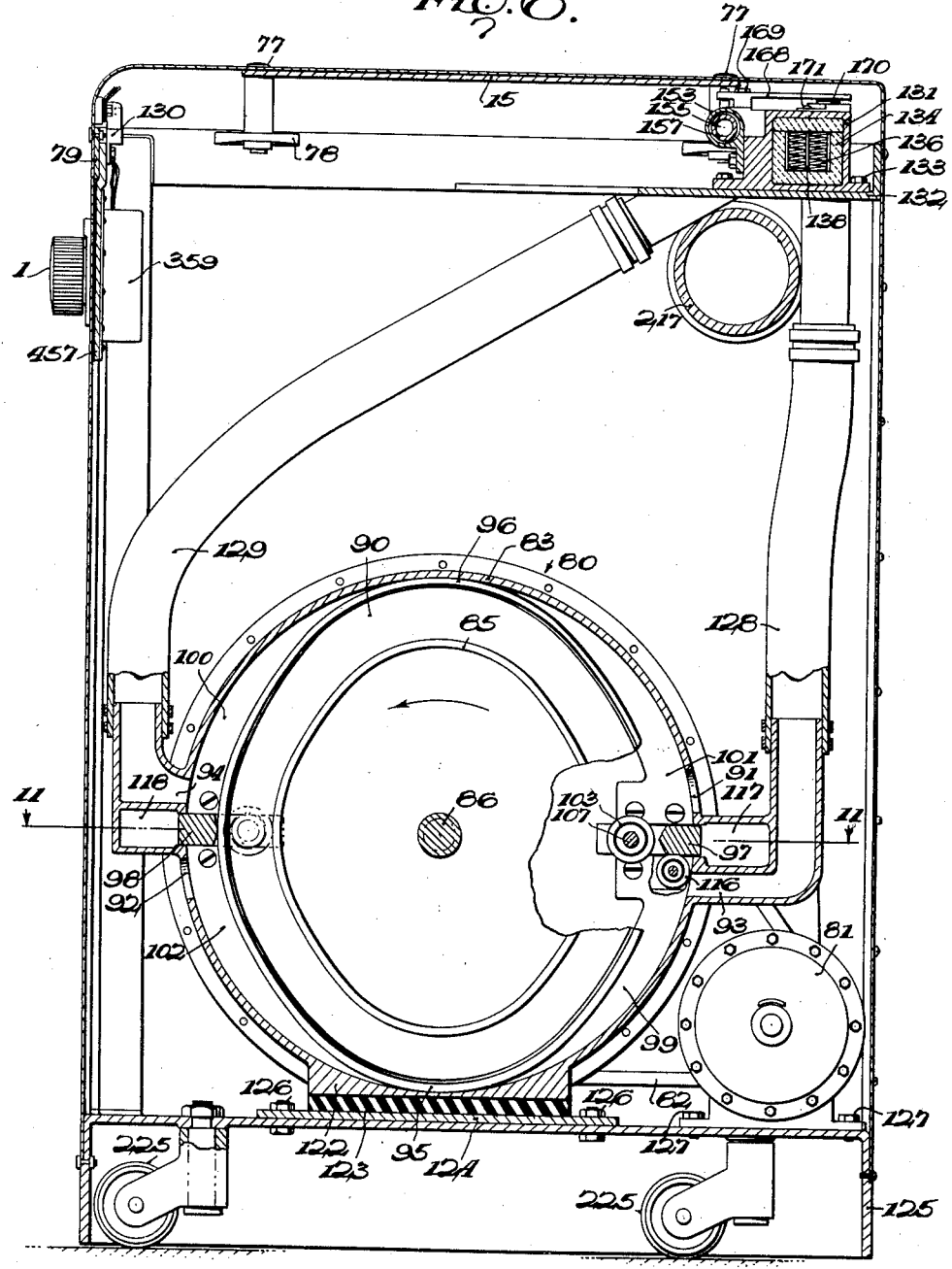

Figs. 4, 5 and 6 are vertical sectional views taken along the lines 4—4, 5—5 and 6—6 of Figs. 1 and 3.

Figure 7:
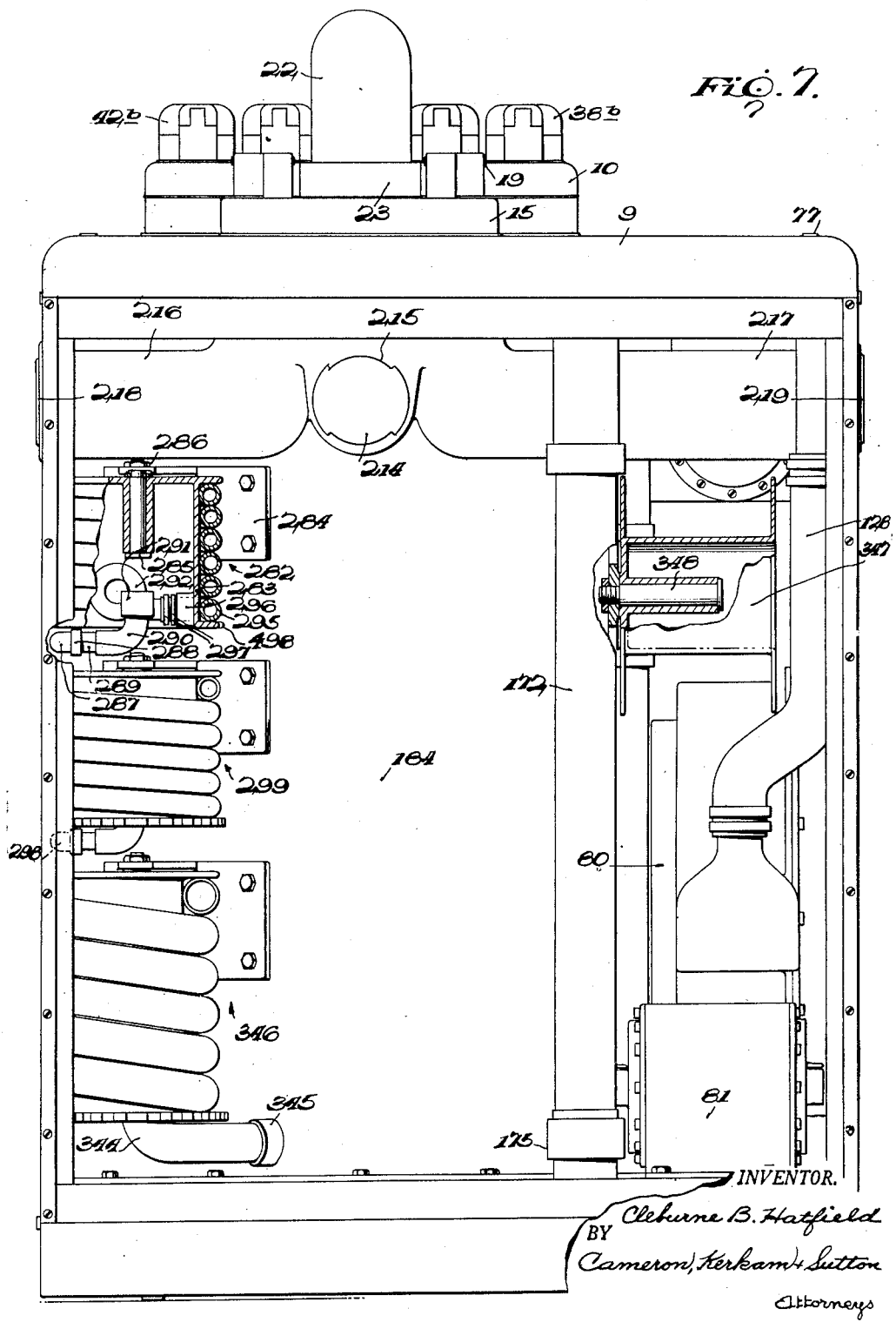

Fig. 7 is a rear view of the machine with the cover plate removed, and with certain parts broken away and shown in section.

Figure 8:
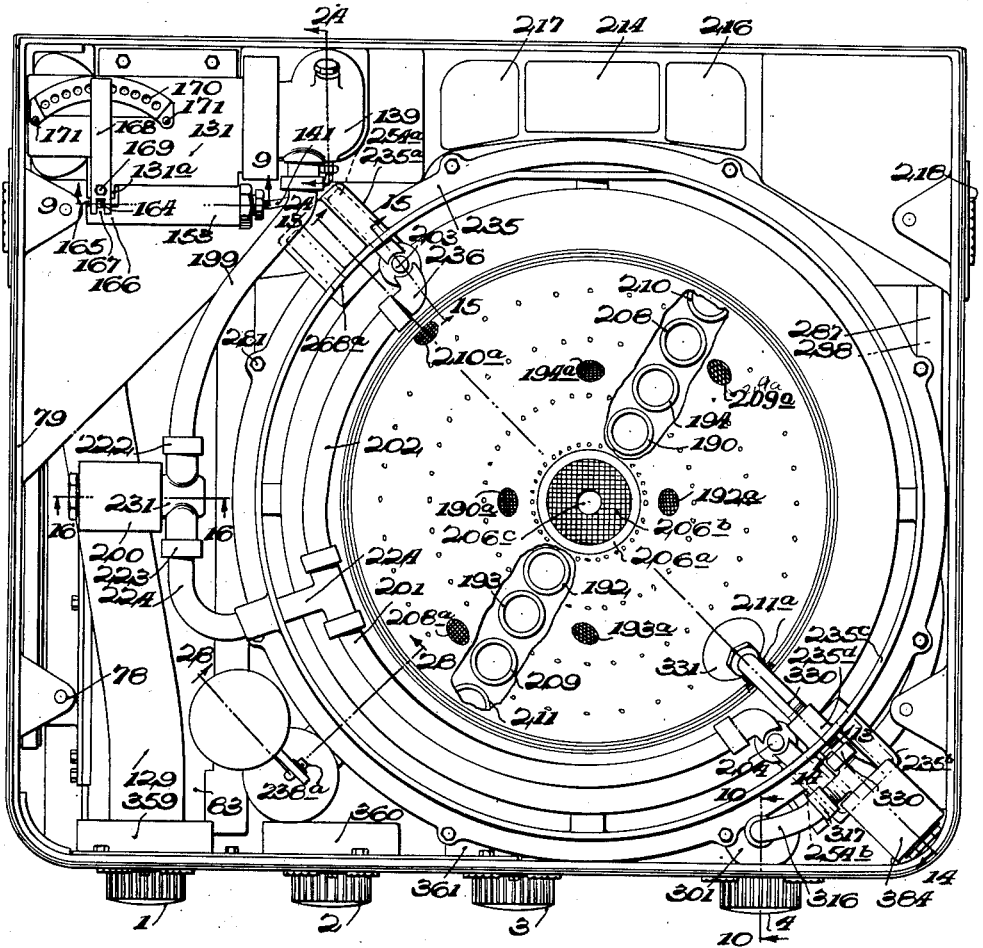

Fig. 8 is a top view of the machine with the lid and top cover assembly removed.

Figure 9:
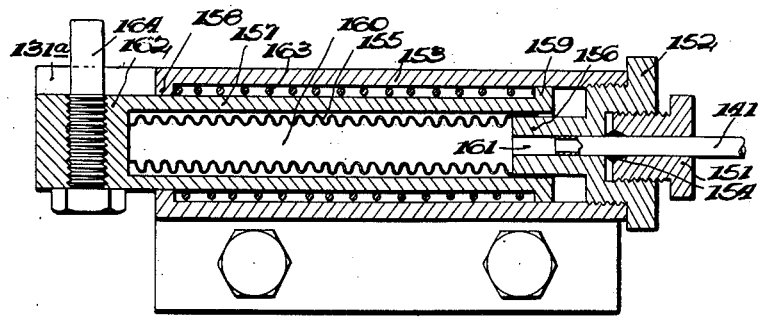

Fig. 9 is a vertical sectional view through the air thermostat, taken along the line 9—9 of Fig. 8.

Fig. 10 is a vertical section through the automatic water mixer, taken along the line 10—10 of Fig. 8.

Fig. 11 is a horizontal section through the air compressor, taken along the line 11—11 of Fig. 6.

Fig. 12 is a horizontal section, on an enlarged scale, through the air heating assembly, taken along the line 12—12 of Fig. 5.

Fig. 13 is a vertical section through the pneumatic spinner motor, taken along the line 13—13 of Fig. 8.

Fig. 14 is a vertical section through the solenoid valve controlling the temperature regulated water line, taken along the line 14—14 of Fig. 8.

Fig. 15 is a vertical section through the air governor valve for the pneumatic spinner motor, taken along the line 15—15 of Fig. 8.

Fig. 16 is a vertical section through the solenoid valve controlling the air line to the pneumatic spinner motor, taken along the line 16—16 of Fig. 8.

Fig. 17 is a vertical section through the air pressure lock for the lid, taken along the line 17—17 of Fig. 2.

Fig. 18 is a horizontal view, partially broken away, through the pneumatic spinner motor, taken along the line 18—18 of Fig. 13.

Fig. 19 is a horizontal section, looking upwardly, through the pneumatic spinner motor showing the roller supports for the reciprocating gates, taken along the line 19—19 of Fig. 13.

Fig. 20 is an enlarged view, partially in section, showing the construction of the swivel joint for one of the water lines leading to the hose drums.

Fig. 21 is a bottom view of the machine showing arrangement of air pipes and the supporting rollers for the machine.

Fig. 22 is a diagram showing the wiring arrangement for the automatic electric controls.

Fig. 23 is a vertical section showing the guide rollers for the reciprocating gates for the air compressor, taken along the line 23—23 of Fig. 11.

Fig. 24 is a vertical section through the helical coil for the air thermostat assembly, taken along line 24—24 of Fig. 8.

Fig. 25 is a typical section through the lateral ball bearing rollers, and rotating wheel bearing flange, taken along any of the lines 25—25 of Fig. 18.

Fig. 26 is a horizontal section through the exhaust air cut off valve assembly, taken along the line 26—26 of Fig. 4.

Fig. 27 is a vertical section through the tub chamber exhaust air pressure safety valve, taken along the line 27—27 of Fig. 26.

Fig. 28 is a vertical section through the float type water cut off switch assembly, taken along the line 28—28 of Fig. 8.

Figure 29:
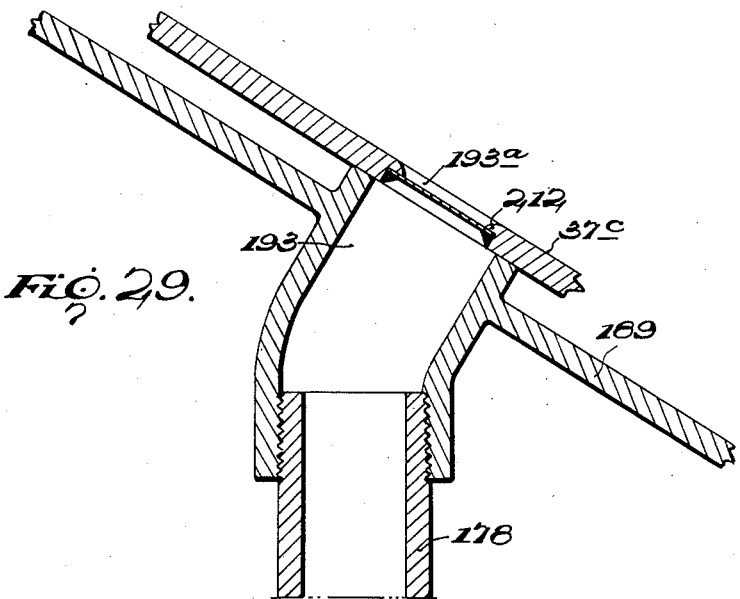

Fig. 29 is a fragmentary vertical section, on an enlarged scale, through one of the elbow pipe fittings of the stationary tub bottom through which air is supplied to the rotating basket.

Figure 30:
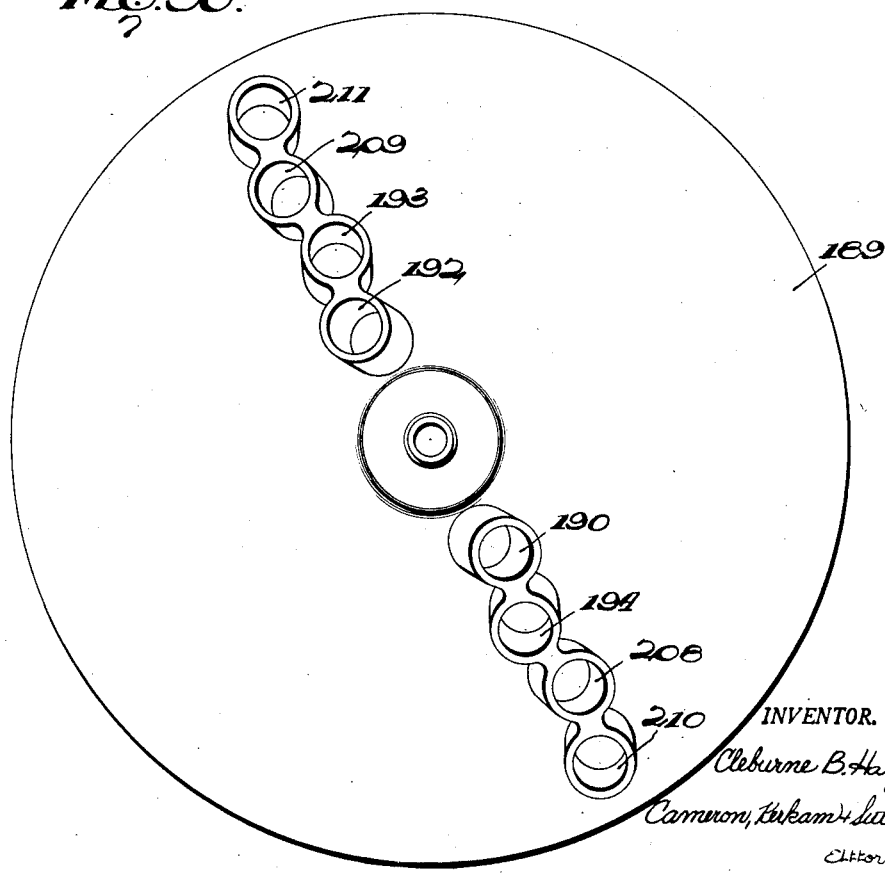

Fig. 30 is a plan view, looking upwardly, of the under side of the tub bottom showing the arrangement of the elbow pipe fittings which direct the air into the basket at different angles with respect to the axis of rotation of the basket.

*The machine structure*

Referring first to Figs. 1, 2 and 3, which show the exterior of the machine, the four control knobs or dials 1, 2, 3 and 4 are disposed in horizontally spaced relationship to each other at the front of the machine. Knob 1 is the control knob for the first washing or soaking process. Knob 2 is the control knob for the second washing or soaking process. Knob 3 is the control knob for the drying process. Knobs 1, 2 and 3 control the setting of the automatic and electric control mechanism. As more fully explained hereinafter, each of the control knobs 1, 2 and 3 is calibrated or marked in minutes and may be varied as to time setting, which permits the user to select the length of time which he desires to be allotted to each of the three processes. Knob 4, carrying a pointer which cooperates with a scale graduated from "Warm" to "Hot," adjusts the setting of the automatic, thermostatic water mixer and temperature regulator in a manner which is also subsequently explained in more detail.

The name plate 5 not only affords a convenient and logical place for a name, but is also designed to harmonize in a tasteful and appropriate way with the ornamental exterior of the machine. The chrome trim bands 6 and 7 likewise cooperate with the ornamental scheme of the cabinet, and in addition serve the utilitarian purpose, as better seen in Fig. 4, of covering the joints between the enameled sheet metal front 8, top 9 and base 125 of the cabinet.

Referring to the top view, Fig. 2, the lid 10 is provided with a handle 11, the lower part 12 of which serves as a means of releasing the catches 13 (see Figs. 4 and 17). When the lid is in a closed position, the catches 13 are secured underneath the lugs 14 on the main frame casting 15 of the top assembly. The movable portion 12 of the handle with its two catches 13 is hinged to the stationary part 11 by the two pin hinges 16. A spring 17 normally holds the movable part 12 in a downward position in which position the catches 13 normally engage the lugs 14.

By a natural and easy movement of the hand of the operator, when the fingers are inserted through the opening 18 and are grasping the handle, the fingers are naturally enclosed around the bottom of the lower movable part 12. Upon lifting upward the lower part 12 is first lifted upward against the spring 17 and rotates on its hinges 16. This moves the catches 13 outward, disengaging them from lugs 14, and the lid is free to raise upward. By continuing to exert a lifting movement on the handle, the lid 10 is lifted upward, swinging on the pins 19. The lid will open to an angle of approximately 90 degrees.

During the swinging movement of the lid about the axis of the pins 19, the air exhaust 20 which is cast as an integral part of the main frame casting 21 of the lid, telescopes into the air exhaust casting 22 which is secured to the main top frame casting 15 by the threaded collar 23. A rubber gasket 24 is secured in a groove in casting 22 and fits around the air exhaust 20, thus preventing escape of exhaust air into the room.

When waste water is being exhausted from the tub by air pressure in the manner hereinafter described, it is important that the lid be locked against flying open if the user should accidentally press upwardly on the part 12 of the handle. In order to prevent this, an automatic air pressure lock is provided for locking the lid shut during the time the waste water is being ejected by air pressure.

As shown in Fig. 17, an air pressure lid lock cylinder 25 is threadedly secured into the main lid frame casting 21 at a point adjacent to the portion 11a of the handle 11, the cylinder 25 extending into a groove 11b formed in the under side of the stationary part of the handle.

Within the air cylinder 25 is disposed the air pressure lid lock piston 27 having an enlarged bearing and pressure end 32. The piston 27 is normally held in its extreme righthand position as shown in Fig. 17, with the enlarged end 32 bearing against the main lid frame casting 21, by the pressure of the spring 26.

An air line in the form of a copper (or other non-corrosive) tube 30 is secured in position with its lower end passing through the bottom of the main lid frame casting 21 and having access to the air and air pressure within the tub 37 when the lid is closed. The lower end of the tube 30 is protected against the direct entrance of water or spray from the tub by a cap 33 having perforations in its vertical wall. The upper end of the tube 30 enters a hole 34 through the side of the main lid frame casting 21 leading to the recess in which the cylinder 25 and piston 27 are housed. The convolutions in the pipe 30 are for the purpose of acting as a baffle for whatever moisture may find its way into the pipe.

When the air exhaust line cut-off valve 35 (see Fig. 4) is closed by energization of its solenoid 36, during the period of discharging waste liquid from the machine by air pressure, in a manner subsequently more fully explained, and air pressure builds up in the airtight tub above the water line to force out the waste liquid, air under pressure enters tube 30. This air flows through the tube 30 until it reaches space 34, whence it exerts pressure against the enlarged bearing and pressure end 32 of the piston 27. This results in the piston 27 being moved forward against the pressure of spring 26, the tapered end 28 of the piston being forced between the lug 29 on the upper surface of the movable part 12 of the handle assembly, and the lug 31 on the lower surface of the stationary part 11. Insertion of the tapered end 28 between the two lugs 29 and 31 locks the movable part 12 of the handle assembly in a downward position, which in turn locks the catches 13 in position underneath the lugs 14.

When the waste liquids have been forced out of the tub 37 by the air pressure and the exhaust line cut-off valve 35 is again opened, the air pressure in the tub 37 will be reduced to approximately atmospheric pressure and the spring 26 will force the piston 27 back against the side wall of the main lid frame casting 21. This removes the tapered end 28 from its position between the lugs 29 and 31 and permits the movable portion 12 of the handle assembly to be lifted up when desired, the lid catches 13 released and the lid raised.

Referring now to Figs. 2, 3 and 5, five cups 38, 39, 40, 41 and 42, having normally closed lids 38b, 39b, 40b, 41b and 42b, are provided for holding washing ingredients. The existence of the five ingredient cups make it possible for the user of the machine to fill the respective cups with proper amounts of the desired ingredients for all operations of the complete washing cycle, before the machine is started. The user may thus insert the soiled clothes, fill the ingredient cups, adjust the dials, all of which will require an estimated time of approximately two minutes, and then leave the machine to operate unattended. No further attention whatsoever will be necessary. A woman user, who is working daily outside the home, may insert the clothes and adjust the machine before leaving for work in the morning, and upon returning in the afternoon, will find the clothes washed, rinsed, wrung (damp dried by centrifugal force), and completely dried (or dried to any desired degree of completion), ready to be removed from the machine.

The cups 38 and 39 may contain the water softener and soap or detergent, respectively, for the first soaping or "soaking" process. The cups 40 and 41 normally contain water softener and soap for the second soaping process. The cup 42 may contain blueing or starch to be added, if desired, during the second rinsing process.

The washing cycle is flexible, as will be later explained, and the user may elect to eliminate the first soaping process if two soaping processes are considered unnecessary, as when washing thin or delicate fabrics. In this case, the dial or knob 1 (Fig. 1) controlling the first soaping process, will not be turned or adjusted, but will be left at zero. The first soaping process will then be automatically eliminated, and the machine will start its cycle of operations with the second soaping process, in which case the user does not fill the first two cups 38 and 39 with the water softener and soap, respectively.

There are certain parts of the United States which have "soft" water, which does not need water softener. In this case, the water softener cups 38 and 40 are left empty or unfilled. Similarly, if the user does not desire on a particular wash to use blueing or starch, cup 42 is left empty.

During the automatic cycle of operations, the bottom of each of the respective cups, at the proper time in the cycle, is momentarily withdrawn by the pull of a controlling electric solenoid, thus dumping the contents of the cup into the washing chamber 37 below.

As will be seen from Fig. 4, wherein is illustrated the detailed construction of the center cup 40, the bottom of the cup is normally closed by a horizontally slidable, flat plate 40a which is fixed to a magnetizable plunger 43. The plunger 43 is slidable in a core 44 of copper or other non magnetic metal, around which is wound a solenoid coil 45. A shoulder 46 is provided on the non-magnetic core 44 which fits against a gasket 47 disposed between the shoulder 46 and the outer portion or bearing seat 21a of the main lid frame casting 21. The open end of the non-magnetic core 44 extends through a hole in the center of the seat 21a, and receives a nut 48, a gasket 49 being disposed between the nut 48 and the annular seat 21b on the inner side of the main lid casting 21. When the nut 48 is tightened against the two gaskets, the juncture between the shoulder 46, the nut 48 and the outer and inner annular seats 21a and 21b, respectively, is made watertight.

The outer end of the core 44 is closed by the stopper nut 50, gaskets 51 and 52 being provided to make the closure watertight. An outer cylindrical covering 53 and collar 54, formed of magnetic material, are provided for the solenoid assembly, in order to eliminate air gaps in the magnetic circuit. When the end stopper nut 50 is secured or screwed down tight, the gasket 51 on the outer surface of the annular end of the cylindrical covering 53, and the gasket 52 disposed between the end of the core 44 and the inner surface of the end of the covering 53, are compressed so as to make the outer end of the core watertight.

A spring 55 normally keeps the plunger 43 in its extreme outward position wherein the flat plate 40a, to which the plunger 43 is attached, closes the lower end of the cup 40. A stop 56, attached by screws to the lower side of the main lid frame casting 21 at the proper point, serves as a stop for the plate 40a. The two edges of the plate 40a slide in the grooves 57 and 58 (Fig. 5) which are formed in the main lid frame casting 21.

The plunger 43 changes diameter intermediate its ends, forming a shoulder 59. One end of the spring 55 presses against this shoulder and the other end against the end stopper nut 50, thus urging the plunger 43 and plate 40a toward a normal outer position in which the bottom of the cup 40 is closed.

When, during the cycle of operations, electric current is permitted to flow around solenoid coil 45, the plunger 43 is moved toward the closed end of the solenoid assembly, against the pressure of the spring 55. This straight linear movement continues until the tapered or cone shaped end 60 of the plunger 43 moves into and is stopped by the cone shaped recess 61 in the inner end of the end stopper nut 50. The sides of this cone shaped recess 61 and of the tapered end 60 of the plunger 43 are sloped to an angle of approximately 30 degrees with the center line. The purpose of the cone shaped recess 61 and end 60 of the plunger is to spread the electro-magnetic force exerted by the solenoid more uniformly over the length of travel of the plunger.

Two holes are provided in the plunger 43. One hole 62 extends longitudinally through the center of the plunger 43, while a second hole 63 extends diametrically through the plunger intersecting the axial hole 62 near the junction between the plunger and the plate 40a. The two intersecting holes create a vent from the inner closed portion 64 of the solenoid assembly, so that when the electric current pulls the plunger 43 toward the end stopper nut 50, any air or water, or mixture of both, which is caught in the diminishing space 64, between the end 60 of the plunger and the recess 61, may escape to the outside of the solenoid assembly and into the tub area 37.

An easy or loose tolerance or sliding fit is provided between the large diameter portion of the plunger 43 and the inner surface of the core 44. In this way, binding or appreciable sliding friction, or resistance against the reciprocating or linear motion of the cup bottom plate, is eliminated. Air or moisture from the tub 37 is free to enter the area 64, but no air or moisture, however violent the agitation or pressure, may escape through the gaskets 47 and 49, or the gaskets 51 and 52, into the area outside of the lid or into the area occupied by the solenoid 45.

The solenoid operated bottoms 38a, 39a, 41a and 42a of the other ingredient cups 38, 39, 41 and 42 are constructed in identical manner to that just described, except that, as indicated in Fig. 4, the solenoids thereof extend toward the rear of the machine, instead of toward the front. The solenoid of the center cup 40 cannot extend rearwardly because of interference with the air exhaust 20.

If one of the processes in the cycle of operations is eliminated by choice of the user, such as the first soaping process, no ingredients are placed in the cup for this step of the process. During the cycle of operations, the bottom of this cup is momentarily slid back at the proper time by the solenoid action, regardless of whether it is filled with ingredients or not. If empty, however, no harm is done, for the bottom is slid back only momentarily, and during the brief time it is open, the lid of the cup is closed and latched, thus preventing the escape of air or water from the tub compartment 37.

The lids of the ingredient cups are normally held closed by spring loaded catches. As a specific example, the lid 40b has a small handle 65 (Fig. 4) projecting in front of the lid and overhanging the wall 66 of the ingredient cup. The projecting handle 65 has a recess 67 in its lower side in which is disposed a spring loaded catch lever 68. This catch lever pivots on the pin hinge 69, and is normally held against the front surface 70 of the cup 40 by the pressure of spring 71. In this normal position, a catch 72 on the lower end of the catch lever 68 is caught under the ledge 73 formed in the surface of the front wall of the cup, and the lid is firmly secured in place.

When the user desires to open the lid in order to place washing ingredients in the cup, he lifts up on the under side of the spring loaded catch lever 68, compresses the spring 71 and rotates the catch lever 68 about the pin 69. This rotation slips the catch 72 out from under the ledge 73 and releases the lid. A continued upward pull on the lid raises it to an open position.

The main lid 10 is secured against leakage of air or moisture during operation of the machine by a rubber gasket 74 which surrounds the annular frustro-conical portion 75 of the main lid frame casting 21, the portion 75 projecting down into the cooperating annular flange 76 which surrounds the opening in the main frame casting 15 of the cabinet top. When the catches 13 of the lid handle assembly are in place, thus securing the lid, the rubber gasket 74 is compressed sufficiently to prevent all leakage of air or moisture from the tub compartment 37 while the machine is in operation.

In order to provide for quick and easy assembly and disassembly of the machine and access to its inner parts, a system of grouping related parts in subassemblies is provided. In the immediate parts under consideration, the entire top of the washing machine may be lifted off by merely removing four bolts 77 (see Fig. 2).

These four bolts pass through the top enameled sheet metal covering 9, through the main top frame casting 15 and are threaded into four horizontal lugs 78 projecting inwardly from the frame 79 (see Fig. 8). When the four bolts 77 are removed, the entire top subassembly may be lifted off, including the enameled sheet metal cover 9, the main top frame casting 15, the entire lid with the five ingredient cups and solenoids, the curved air exhaust pipes 20 and 22, the air exhaust cut off valve 35 with its solenoid control 36, and all other parts of the machine above the main frame 79 which are included in the top subassembly.

The electrical connections which are required for the circuits which provide power for the solenoids controlling the opening of the bottoms of the ingredient cups and the air exhaust cut off are connected to the electric circuit of the lower part of the machine through a suitable socket or knife type switch, indicated at 130 in Fig. 6, so that when the four bolts 77 are removed and the top assembly lifted off, the connection is automatically broken without the necessity for any wiring changes. When the top sub-assembly is replaced, the electrical socket or knife type switches are again closed by simply lowering the top into place.

The machine of the present invention is so constructed and arranged that pneumatic pressure is used throughout the cycle of operations to stir, agitate and (aided by a soap or detergent) cleanse the clothes, to furnish the power for driving the spinning basket, and for the drying process. This unique triple use of compressed air in the same machine, from a single source, serves to greatly simplify the mechanism, the power transmission, the controls and general construction of the machine. The expense and high cost of manufacturing gear type drives for agitation and spinning action, and the wear, maintenance and problems of lubrication attendant to gear type transmissions, are also eliminated. Much longer life for the machine is thus provided.

In the embodiment illustrated, the air is provided by an air compressor 80 driven by a standard one-fourth horsepower electric motor 81, or a motor of other suitable size, by means of a V belt 82 (Figs. 5 and 6). The compressor 80 is preferably of the rotary type disclosed in my application Serial No. 584,293, filed March 23, 1945. Such a compressor combines the advantages of the positive compression of the piston type compressor with the symmetry and smooth rotary motion of the centrifugal type pump. The complete symmetry of construction and rotary motion eliminate the vibration which is characteristic of the piston type pump.

As shown, the pump or compressor 80 is composed of three principal parts, a main housing consisting of a rim casting 83 (see Fig. 5), a side plate 84, and a rotating wheel 85 which turns on a shaft 86 formed as an integral part of the rotating wheel. The shaft 86 is supported at its ends by ball bearings 87 and 88 housed in the side plate 84 and rim casting 83, respectively. The rotating wheel 85 has two cam grooves 89 and 90, one in either side, located near the outer edge of the wheel.

The right side of the compressor (as viewed in Fig. 6) has an air inlet at 91 and an outlet at 93, while the left side has an air inlet 92 and an outlet 94, the inlets 91 and 92 being formed as mere openings of appropriate size in rim casting 83 leading to the atmosphere, while outlets 93 and 94 exhaust into hoses 128 and 129, later to be described. The rotating wheel 85 is non-circular, having two diametrically opposite, outwardly projecting lobes or bulges 95 and 96 which extend to the cylindrical rim of the casting 83, with just sufficient clearance to prevent rubbing or sliding friction between the tips of the bulges 95 and 96 and the inner surface of the rim casting. The bulges 95 and 96 have a substantial peripheral extent, on the order of 120° each, in order that they may have a gradual slope outward to the tips and inward again, for reasons subsequently more fully explained.

Two radially reciprocating gates 97 and 98 (see Figs. 6 and 11) divide the inlet side of the pump from the outlet side. In Fig. 6 the wheel 85 is assumed to be rotating in a counterclockwise direction. In the position of wheel 85 illustrated, the space 99, bounded by the lower righthand portion of the periphery of the rotating wheel, the inner surface of the rim casting 83 and the righthand reciprocating gate 97, is filled with air under compression which is being forced out through the outlet 93. The space 100, which is bounded by the upper lefthand portion of the surface of wheel 85, the inner surface of the rim casting 83 and the lefthand reciprocating gate 98, also contains air under pressure which is being forced out through the outlet 94. The spaces 101 and 102, which are bounded by the upper right and lower lefthand portions of the periphery of the wheel 85, the inner surface of the rim casting 83 and the right and lefthand reciprocating gates 97 and 98, are filled with air at atmospheric pressure, or slightly below, which is being drawn in through the inlet ports 91 and 92.

As the wheel 85 rotates in a counterclockwise direction, the compressed air in space 100 is pushed forward by the projecting lobe or bulge 96 and is forced out through the outlet 94. In a similar manner, the compressed air in the space 99 is pushed forward by the projecting bulge 95 and is forced out through the outlet 93. While this is occurring, the volume of spaces 101 and 102, which contain air at atmospheric pressure, is being increased by the forward movement of the bulges 95 and 96 so as to suck more air into the compressor through the inlets 91 and 92.

The gates 97 and 98 (see Fig. 11) are U-shaped so as to straddle the periphery of the rotating wheel 85, and are supported in constant close proximity to said periphery by pairs of ball bearing rollers 103, 104, 105 and 106 mounted on pins 107, 108, 109 and 110, respectively, which pins pass through and are fixedly secured in the legs of the gates 97 and 98 in positions parallel to the shaft 86.

As seen in Fig. 11, each of the cam grooves 89 and 90 in the rotating wheel 85 is formed with an offset or ledge such that the outer half of the groove (in the direction of its depth) has its circumferential sides disposed slightly further from the axis of rotation of the wheel 83 than does the inner half of the same groove. This arrangement allows the outer roller of each pair of rollers 103—106 to roll in pressure contact on the radially inner side of the associated cam groove, but with a small clearance between it and the radially outer side of the same groove, while the inner roller of each pair rolls with pressure contact on the radially outer side of the same groove. One of the rollers of each pair thus rolls in one direction while the other roller rolls in the opposie direction. By this means, the radially inner edges of the reciprocating gates, which are preferably beveled as shown in Fig. 6, are maintained in fixed space relationship with, and in close proximity to, the outer surface of the rotating wheel 85.

As the wheel 85 rotates, the gates 97 and 98 "ride up" the surfaces of the projecting lobes or bulges 95 and 96, due to the camming action of the cam grooves 89 and 90 and the following ball bearing rollers 103—106, so that the close clearance and fixed space relationship between the inner edges of the gates and the outer rim surface of the rotating wheel is continually maintained.

Each of the reciprocating gates 97 and 98 is also supported for reciprocation in a radial direction by rollers which bear against the side edges of the legs of the gate. As shown in Figs. 6 and 23, a pair of linear grooves or rabbets 111 and 112 is formed in the edges or corners of each leg of the reciprocating gate 97, the grooves extending radially with respect to the wheel 85 and receiving rollers 113, 114, 115 and 116 which are mounted on pins or spindles 113a, 114a, 115a and 116a threadedly secured to the side wall of rim casting 83 and to side plate 84. The edges of both legs of the gate 98 are engaged by rollers in a similar manner. As a result of this construction, when the two gates 97 and 98 simultaneously reciprocate back and forth as a result of the cam action of the cam grooves and the pairs of rollers which roll in said grooves, the gates are accurately held against sidewise or edgewise motion and may reciprocate with straight linear motion in a radial direction only. Pockets 117 and 118 are formed in the rim portion of casting 83 and in the corresponding portion of side plate 84 to provide enclosed spaces to receive the ends of the gates 97 and 98 when the latter reciprocate.

The projecting lobes or bulges 95 and 96 of the rotating wheel 85 are designed to cover a relatively large portion of the circumference of the wheel (approximately 120° for each) in order that the cam pressures may be kept as low as possible, particularly during rotation of the wheel at high speeds. The cam grooves may be designed to give simple harmonic motion to the reciprocating gates, in which event the rim of the rotating wheel would be designed to correspond.

As seen best in Figs. 5 and 11, the compressor is driven through a pulley wheel 119 keyed on one end of the shaft 86 which projects through a centrally disposed opening in the side plate 84, the pulley wheel being secured in place by a nut 121. A V groove 120 is formed in the rim of the pulley to accommodate the V belt 82 which drives the pulley from the motor 81 (Fig. 6).

A flat seat 122 is formed on the lower portion of the rim casting 83, the bottom surface of which seat is cemented to a rubber pad 123, which is in turn cemented to a flat metal plate 124 bolted to the cabinet bottom casting 125 by bolts 126. This arrangement, in combination with the symmetrical construction and rotary method of operation of the compressor, fully eliminates vibration and makes for noiseless operation of the machine.

The electric driving motor 81 is also secured to the cabinet bottom casting 125, by the bolts 127, and may likewise be mounted on a rubber pad, if desired.

As may be seen from the above description, the air compressor thus described has perfect symmetry of construction, rotary motion, and freedom from vibration. At the same time, the advantages and efficiency of positive compression of the air are afforded. Furthermore, the novel manner in which the moving parts are supported permits close tolerances and yet avoids rubbing or sliding friction and makes possible the use of ball bearings and ball bearing rollers which are permanently grease packed, thereby eliminating the need for lubrication of the compressor.

Continuing with the description of the passage of compressed air through the machine, air forced from the right side of the compressor (as viewed in Fig. 6), upon passing through the outlet 93, enters the rubber hose 128 and is delivered thereby to the air heating assembly. Air from the left side of the compressor passes through the outlet 94 and into the hose 129, which also leads to the air heating assembly.

Referring now more particularly to Fig. 12, the air heating assembly is housed in a casting 131 which is secured to the top cabinet frame casting 132 (Fig. 6) by the machine screws 133. The compressed air from the left side of the air compressor enters the air heating assembly through the hose 129 and inlet 129a, while air from the right side of the compressor enters through the hose 128 and inlet 128a.

The inside of the housing 131 is provided with a liner 134 of ceramic or other suitable material, which serves both as an electrically insulating support for the electric heating coils and also for the conservation of heat.

The air flows from inlets 128a and 129a are united in the chamber 135, wherein are mounted a pair of helical electric heating coils 136 and 137 disposed in a vertical position. The sides of the ceramic liner 134 are curved inward at two points, as shown in Fig. 12, to partially surround each electric coil and hold it securely in its vertical position against the blast of compressed air which continually rushes through the chamber 135, at high speed and under considerable pressure, during operation of the machine.

A ceramic dividing support 138, of streamlined contour, is disposed in the center of the passageway through the chamber 135, and is provided with notches in its fore and aft edges of the proper size and spacing to receive the coils of each heating element. This construction eliminates vibration of the coils 136 and 137 which would otherwise result from the high velocity flow of compressed air through the chamber 135.

With this construction, the compressed air must first pass through the narrow passageways between the coils of the helix 136, enter the inside of that helix, and then again pass between the finely separated coils thereof before reaching the second helix 137 where the same procedure is repeated. The air leaving the helix 137 passes into the elbow pipe and air thermostat housing 139, which leads the compressed (and now heated) air out of the air heating assembly. The elbow and air thermostat housing 139 is secured in position against the exit end of casting 131 by a threaded collar 140.

As a result of this novel arrangement of the electric heating elements and other parts of the air heating assembly, the compressed air must pass through each coil or helix in such a manner that the particles of air come into more intimate contact with the hot wires than in any other known arrangement, thus providing a more efficient heating unit than those heretofore available.

The present invention also provides a unique and improved means for controlling the temperature of the heated air and keeping its temperature within desired limits, which means will now be described.

Referring to Fig. 24, which is a vertical section through the elbow and thermostat housing 139, the upper end of which appears in Fig. 12, there is shown therein a long, double helical coil 141 of fine copper tubing having one end 142 fixed within an internally threaded boss 143 which projects from the upper side of the housing 139. An externally threaded plug 144, having an axial bore 145 extending part way through the plug, is screwed into the boss 143 and receives the end 142 of the coil 141. The inner end of the plug 144 is internally beveled, and fits over and presses against a soft, half-round pressure ring 146. When the plug 144 is screwed tightly into the boss 143, the pressure of the internally beveled end of the plug 144 compresses the soft pressure ring 146 around the outer end 142 of the copper pipe 141 with such force that the end of the tube is both effectively sealed and fixed in place in the boss 143.

The tube 141 extends in a double helix for several inches downward from the end 142 and upward again, and then passes out of the housing 139 through an internally threaded boss 147 opposite the boss 143. The lower end of this double helical coil of tubing is supported by a collar 148 against excessive vibration in a vertical direction due to the passage of the compressed air through the housing 139. The tubing 141 passes entirely through an externally threaded plug 149 which is screwed into the boss 147. The plug 149 also has an internally beveled inner end which fits over a soft pressure ring 150. When the plug 149 is screwed tightly into place, the end of the tube 141 which passes through the boss 147 is securely fixed in the boss by the pressure ring 150.

Referring now to Figs. 8 and 9, wherein the arrangement of the remainder of the automatic air thermostat control mechanism is shown, the copper tube 141 can be seen in Fig. 8 emerging from the elbow pipe 139 and entering the outer cylinder 153 of the metal bellows assembly, the details of which are shown in section in Fig. 9. The end of tube 141 which enters cylinder 153 passes through the bore of an externally threaded plug 151 and partially through the end plug 152 of the cylinder 153 into which the plug 151 is threaded. The inner end of plug 151 presses against a soft metal pressure ring 154, so that when the plug is tightened, the pressure ring is compressed with such force around the end of the pipe 141 that the latter is fixed in fluid tight relationship in the end plug 152.

Welded or brazed on an extended boss 156 of the end plug 152 is the open end of a metal bellows 155 which is enclosed within the inner cylinder 157 of the bellows assembly. The outer end of the cylinder 157 passes through a centrally disposed opening in the end 158 of the cylinder 153, while its inner end is provided with a flange 159 having a sliding fit within the interior of the outer cylinder 153.

The interior 160 of the metal bellows 155 is connected with the interior of the helix or coil 141 by a passageway 161 through the end plug 152. The entire volume of the interior of the metal bellows 155 and the interior of the coil 141 is filled with a suitable heat expansible liquid, such as oil.

The closed outer end of the metal bellows 155 rests against the closed end of the inner cylinder 157. A spring 163 is disposed within the outer cylinder 153 with one of its ends resting against the partially closed end 158 of the cylinder 153, and the other end thrusting against the flange 159 of the slidable inner cylinder 157. The spring 163 is in compression at all times and keeps the inner cylinder 157 firmly pressed against the closed outer end of the metal bellows 155.

As the hot air rushes through the elbow pipe 139, the air flows around the coiled pipe 141, and the heat of the air is quickly transmitted through the thin walls of the pipe to the column of oil therein. Since the end 142 of the pipe 141 (see Fig. 24) is closed by the plug 144 and the soft compressible metal ring 146, expansion of the heated column of oil in the tube 141 causes it to flow through the passageway 161 and into the interior 160 of the metal bellows 155, thereby expanding the bellows against the pressure of the spring 163. When this expansion takes place, the inner cylinder 157 is forced to slide outwardly against the pressure of the spring 163 an amount proportional to the temperature of the air flowing around the helical coil 141 in elbow pipe and housing 139.

A pin 164 is threadedly secured in the closed outer end 162 of the inner cylinder 157, and is held in a vertical position by a slot 165 formed between an extension 166 of the outer cylinder 153 and a projection 131a on the air heating assembly housing 131 (see Fig. 8). The upper end of the pin 164 passes through a slot 167 in one end of a rheostat contact lever 168 which is pivotally mounted on the outer casting 131 of the air heating assembly by means of a pivot pin 169. A rheostat 170 for controlling the electric current which passes through the heating elements 136 and 137 is secured to the upper surface of casting 131 by machine screws 171. This thermostat is formed in an arc, the center of which coincides with the center of the pivot pin 169, and is contacted by the lever 168.

The distance from the pivot pin 169 to the portion of lever 168 which contacts rheostat 170 is several times greater than the distance from the pivot pin 169 to the pin 164 (a ratio of the order of 10 to 1). As a result of this ratio, a small movement of the inner cylinder 157 due to expansion or contraction of the fluid in the thermostat coil 141 will cause a much greater movement of the end of the rheostat contact lever 168 which makes contact with the rheostat 170.

The novel thermostatic mechanism thus provided is highly sensitive, very reliable and quick in reponse to temperature changes, and with proper calibration, by varying the rheostat 170 and thus varying the current flowing through the heating element 136 and 137, will maintain the temperature of the heated air flowing through the machine within the limits desired.

When the compressed air leaves the elbow pipe and housing 139 occupied by the thermostat coil 141, it passes downward into a connecting pipe 172 which is secured to the elbow 139 by the threaded collar 173 (Figs. 4 and 24). The pipe 172 carries the air downwardly into a horizontal pipe 174 located beneath the main base casting 125, a threaded elbow 175 connecting the pipes 172 and 174.

From the horizontal pipe 174 the air is distributed by a distribution pipe 174a to eight upwardly extending pipes 176, 177, 178, 179, 180, 181, 182 and 183 (Figs. 4, 5 and 21) which are adapted to supply air under pressure to the interior of the rotatable basket or spinner of the machine.

Reference will now be had to Figs. 4 and 5, which are vertical sections through the tub and rotating basket of the machine. The tub supporting cylinder 184 of the washing machine is secured to the main base casting 125 of the cabinet by bolts 185. The upper end of cylinder 184 supports the air motor housing 186 which is secured thereto by machine screws 187. The stationary tub 188 is similarly secured to a downwardly depending flange 186a which forms the rim of a large centrally disposed opening in the air motor housing 186. The tub 188 has a conical bottom portion 189 provided with eight pipe fitting elbows 190, 192, 193, 194, 208, 209, 210 and 211 (see also Figs. 8 and 30), which elbows are preferably cast integrally with the conical bottom. The conical bottom 189 is also provided with a centrally located, downwardly extending drain casting 195 having an internal shoulder 196 on which is supported a plastic or hard rubber water lubricated bearing 197. The space between the tub supporting cylinder 184 and the fixed tub structure 188, 189 is filled with suitable insulation 353 for purposes of heat conservation.

Encompassed by and centrally disposed within the stationary tub 188 is the rotatable tub or basket 37 in which the clothes are contained throughout the washing and drying cycle. The basket 37 is fabricated of three parts, a top part 37a comprising a stamping or casting which serves as the rotor of the pneumatic basket driving motor subsequently described, a perforated cylindrical center part 37b, and a conical bottom part 37c, all three being joined together in any suitable manner, as by welding or brazing.

The top part 37a of the basket is supported both vertically and laterally, and held in true central position, by various ball bearing rollers which are embodied in the air pressure motor later to be described, while the lower end of the bottom part 37c is held in true position laterally by the water lubricated bearing 197. The rotating basket or spinner is thus securely held in proper vertical and lateral position, and may spin freely with little friction, both slowly during the washing, rinsing and final drying processes and rapidly during the extracting and damp-drying steps.

The bottom portion 37c of the rotating basket assembly is cast in a conical shape with a downwardly extending, centrally disposed flange 205 adapted to be seated in the bearing 197 and forming the outlet of the basket leading to the drain 195. A lint sieve 206, consisting of an annular metal frame 206a, a wire mesh bottom 206b and a central knob or handle 206c, is supported in the outlet formed by the flange 205 on a ledge or shoulder 207 extending inwardly from the inner surface of said flange.

Referring now to Fig. 8, which is a view looking downward into the rotatable basket 37, eight air supply ports 190a, 192a, 193a, 194a, 208a, 209a, 210a and 211a can be seen in the cone shaped bottom portion of the basket. Each of these ports is covered with a wire mesh screen which is secured against being blown upward by the blasts of air by being seated against a shoulder 212 (see Fig. 29) formed in the bottom surface of the lower part 37c of the basket. The cone shaped bottom 37c of the basket is sufficiently thick, and the recesses 212 are sufficiently deep, to permit the wire mesh port covers to be suitably secured against the shoulders 212 by brazing or other suitable means, and the brazing still be flush with the smooth exterior of the rotating basket bottom.

As shown in Fig. 8, the ports in the basket bottom are formed in pairs, the two ports of each pair being diametrically opposite one another and the same distance from the vertical center line or axis of the basket, but lying on a different diameter and at a different distance from said axis than every other pair. The pipe fitting elbows 190, 192, 193, 194, 208, 209, 210 and 211, which are cast integrally with the stationary tub bottom 189, are all disposed on a single center line which constitutes a diameter through the vertical axis of the tub. The elbows are so shaped, however, as to direct the air upwardly at different angles with respect to the vertical, both inwardly toward and outwardly away from the axis of rotation (see Fig. 30). Furthermore, the angularities of the elbows also vary in that alternate pairs direct their simultaneous blasts of air to alternately "lead" or "lag" with respect to the direction of rotation of the basket; that is, one pair of elbows directs two blasts of air to form a "leading" angle with respect to the diameter which passes through the associated ports, while the next pair directs the blasts in such a direction as to form a "lagging" angle with respect to the diameter which passes through the next two ports. This arrangement causes each pair of simultaneous air blasts to tend not only to exert a force upward, but also to give the contents of the basket an alternate accelerating or decelerating "twirl" with respect to its uniform speed of rotation.

Since the center lines of the various pairs of air ports in the basket bottom make angles of 45° with each other, for each 45° of rotation of the basket a pair of ports will revolve to positions immediately above their corresponding pipe fitting elbows. During the period when each pair of air ports passes over the corresponding elbows, two powerful blasts of air blow up into the basket and cause violent aeration and agitation of the contents thereof. The varying distances from the axis of the ports, the varying angles of the blasts of air with respect to the vertical, and the varying angles of the blasts of air with respect to "leading" or "lagging" the direction of rotation of the basket, combined with the high pressure of the compressed air itself, give the contents of the tub a varied and powerful kind of agitation which is new to the art and results in superior aeration and cleansing.

The under side of the cone shaped bottom 37c of the rotating basket is machined or ground smooth and fits over the ends of the elbows with a close clearance (see Fig. 29). The upper ends of the elbows are also ground to a curved surface to conform to the conical exterior of the basket bottom. Consequently, when a port is not over one of the elbow openings, there is no appreciable leakage of compressed air and the pressure builds up in the supply pipes. When a port then passes over the elbow in its rotating movement, a strong momentary blast of air occurs.

After pushing through the mixture of water and clothes, in the form of powerful blasts, the air emerges from the water in the tub and enters the area above the surface of the water. This air then must be exhausted from the machine because more air is constantly being supplied by the compressor.

As shown in Fig. 4, a suitable exhaust is provided through the pipe 20 and casting 22, the air first passing through the baffles 213 in order to prevent water spray from being carried out of the machine with the air.

During the agitation phases of the washing process, the exhaust line cut-off valve 35, which is controlled by the solenoid 36, is spring-urged into the position illustrated in Fig. 26, wherein the lower end of the exhaust casting 22 is unobstructed and the air has a clear passageway out of the machine through whichever of the outlet conduits 214, 216 and 217 (Figs. 4, 5, 8 and 26) is open. Three different exhaust outlets are provided for the convenience of the user so as to insure that, regardless of where the window or other opening in the room is located with respect to the machine, an outlet will be readily accessible. One outlet is provided by the conduit 214 which leads to the rear of the cabinet of the machine. An interrupted screw thread joint 215 is provided at the outlet end of conduit 214 to receive a suitable cover plate when this particular outlet is to be closed. Another outlet is provided by the conduit 216 leading to the right side of the machine, while the third outlet is provided by the conduit 217 at the left side. The latter two conduits, when not used for air exhaust, are closed by cover plates 218 and 219, respectively, which are secured to the ends of their respective conduits by interrupted screw thread joints similar to that shown at 215.

In the event that it is not desired that the saturated air pass into the room wherein the machine is being used, a light rubber-impregnated, fabric hose (not shown) may be attached to the machine at one of the exhaust outlets, by an interrupted screw thread joint, to carry the saturated air out of the room. When not in use, this hose may be stored on a drum 347 (Fig. 7) rotatably mounted on a horizontal spindle 348 adjacent the left rear corner of the machine and readily accessible when the rear cover plate of the cabinet is removed.

Attention will now be given the pneumatic or compressed air motor which drives the rotatable basket 37 at both slow and high speeds during various phases of the cycle of operation of the machine, which motor is similar in construction to the air compressor 80 previously described.

To operate the motor, a small portion of the compressed air passing through the elbow pipe and housing 139 is diverted through a pipe 199 (see Fig. 8) to a solenoid operated air valve 200, thence through pipes 224, 201 and 202 to governer controlled valves 203 and 204, and finally into the two inlets of the air motor.

In Fig. 16 the solenoid operated air valve is shown in its full open position, the air passageway 220 being unobstructed so as to allow a maximum volume of air to flow through the valve to the compressed air motor. This is the position occupied by the valve when the basket is being driven at high speed during the wringing and damp-drying steps.

The solenoid valve 200 is similar in construction and operation to the solenoid valves which control the bottoms of the ingredient cups, previously described. As shown, a combination main valve casting and solenoid core 221, of nonmagnetic material, is connected to the pipes 199 and 224 (Fig. 8) by a pair of union nuts 222 and 223. A plunger 231 is slidably disposed within the cylindrical bore 221a of the main casting 221. Surrounding the solenoid core portion 221b of the casting 221 is an electric solenoid coil 226 housed in an outer cylindrical casing 227. The end of the core portion 221b is closed by a stopper nut 228, which passes through a centrally disposed opening in the end of the outer coil casing 227. A gasket 230 is inserted between the end of the casing 227 and end of the solenoid core 221b, and another gasket 229 is inserted between the stopper nut 228 and the end of the casing 227, so that when the stopper nut 228 is screwed tightly into the core 221b, the gaskets render the solenoid valve assembly completely airtight.

The reciprocable plunger 231 which is slidably housed within the core 221b is provided with an enlarged end 231a of frustro-conical shape which, when in closed position, fits into a seat 229a of similar shape formed in the casting 221. An annular groove 232 is formed in the conical surface of the end 231a of the plunger, so that when the plunger moves forward into its seat and obstructs the passage 220, the small passageway provided by the groove 232 still permits a small quantity of air to pass from the pipe 199 to the pipe 224. It is this small quantity of compressed air, passing through the groove 232, which drives the pneumatic or compressed air motor slowly during the washing, rinsing and final drying operations.

The plunger 231 is normally held in a closed position by a helical spring 233 interposed between the stopper nut 228 and the shoulder formed by the enlarged end 231a of the plunger. When an electric current passes through the solenoid coil 226, the plunger 231 is pulled against the spring 233 and moves to the left (as viewed in Fig. 15) until it comes to a stop against the stopper nut 228. The outer end of the plunger 231 is conical in shape to fit into a conically shaped recess in the end stopper nut 228, for the reasons previously explained in the case of the solenoids which control the bottoms of the ingredient cups. In order that an obstructing pocket of air will not be caught between the outer conical end of the plunger 231 and the end stopper nut 228, or between the frustro-conical end 231a and the frustro-conical seat 229a, the plunger is provided with an aixal bleeder hole 231b and an intersecting diametrical hole 231c.

The compressed air leaving the solenoid valve 200 passes through the pipe 224 (Fig. 8) and is then divided by the T fitting 234 so that half the air passes through pipe 201 to one inlet side of the basket spinning air motor while the other half travels through the pipe 202 to the other inlet side of the spinner motor. Before entering the motor, however, the air passes through a pair of governor controlled valves 203 and 204 of identical construction, one of which will now be described.

As shown in Fig. 15, the main casting 237 of the governor valve assembly is threadedly secured in an enlarged portion 235a (see Fig. 8) of the air motor cover plate 235. Air from the pipe 202 enters the top of the casting 237 through the elbow passageway 236. The casting 237 is provided with a downwardly extending cylinder 237a in which a valve plunger 238 is housed. The plunger 238 has a raised rim or collar 238a which slidably contacts, with loose tolerance, the interior of the cylindrical portion 237a of the casting 237, and guides the sliding motion of the valve plunger 238 at its upper end. Two keys 238b, formed as integral parts of the plunger 238, slide in keyways 238c cut in the interior surface of the cylinder 237a, and guide the lower end of the plunger 238. The upper end of the plunger 238 is formed to receive a frusto-conical stopper 243, made of neoprene or other suitable resilient material, which has a centrally disposed hole extending therethrough and is slipped onto the receiving spindle 238e over the upset end flange 238f.

A flange 238d, mounted on the lower end of the plunger 238 in any suitable manner, forms a seat for the lower end of a helical spring 239, the upper end of which bears against a shoulder 237b formed on the casting 237. A roller 240 is rotatably mounted in a recess in the lower end of the plunger 238 on a pin 241, and rolls on the upper surface of a governor ring 242 (see also Fig. 13).

When the critical or designed maximum speed of the spinning basket is reached during the wringing and damp-drying phases of the cycle (i. e., during the extraction of water from the clothes by centrifugal force), the governor ring 242 is raised, in a manner subsequently more fully described, and the roller 240 and plunger 238 are forced upwardly against the compression of spring 239 until the air passage 244 through the casting 237 is partially or completely closed by the stopper 243, thus restricting or cutting off entirely the flow of air to the air motor which drives the spinning basket.

As indicated in Fig. 18, the air governor ring 242 is supported by radially movable blocks 245 at three points equidistantly disposed around its circumference, the detailed construction of one of said supports appearing in Fig. 4. As there shown, each governor block 245 is provided with a radially extending recess in its outer side which encompasses a helical spring 247. A narrow vertical flange 248, whose upper edge provides an inclined plane surface, is formed on the upper surface of the block 245, and supports a flanged roller 249 which is journaled on a pin 251 supported by a divided boss 250 extending downwardly from the under side of the governor ring 242. The outer end of the compressed helical spring 247 rests against the cam groove flange 252 of the upper portion 37a of the rotating basket. The block 245 is slidably mounted for horizontal movement in a radial direction in a housing 253 which is secured by machine screws to the portion 37a of the basket.

The three air governor blocks 245 are normally held in the radially inward position shown in Fig. 4 by the forces of springs 247 and springs 239 (see Fig. 15), the latter exerting a resultant inward force through the rollers 249 and the inclined planes 248, by exerting pressure downward on governor ring 242.

When the rotating basket spins at such speed that the centrifugal force exerted on the blocks 245 becomes greater than the initial force of compression to which the springs 247 and 239 are subjected in the assembly, the blocks 245 move outwardly, the flanged rollers 249 roll up the inclined planes 248, the air governor ring 242 is lifted, and the air passage 244 of each of the governor valves is completely or partially closed by upward movement of the associated valve plunger 238. The speed at which the governor mechanism becomes operative is determined by the strength of the springs 247 and 239 and other factors of design, and preferably lies in the approximate range from 800 to 1200 revolutions per minute of the basket.

After passing through the air governor valves, the compressed air enters the air inlet passageways 254a and 254b (see Figs. 8 and 13) in the cover plate 235 of the air motor and is thence led downwardly through corresponding and cooperating passageways 255a and 255b in the air motor housing 186. In following the inlet passageways 254a, 254b, 255a and 255b, the air passes through two 90 degree turns in each pair of passageways, and then enters the inlet or pressure chambers of the air motor (Fig. 18).

As previously mentioned, the air motor is similar in construction to the compressor 80, embodying a non-circular rotor, a circular housing and a plurality of radially reciprocable gates which divide the space between the rotor and housing into non-communicating inlet and outlet chambers. In the position of the rotor shown in Fig. 18, one inlet or pressure chamber 257a is bounded by the reciprocating gate 258a, the circular interior surface of the air motor housing 186 and a small sector of the non-circular rim 256 of the upper portion 37a of the rotating basket, while a second inlet or pressure chamber 257b is similarly bounded by the reciprocating gate 258b, the interior surface of the housing 186 and another, somewhat larger sector of the rim 256. The reciprocating gates 258a and 258b also divide the high pressure inlet sides or chambers 257a and 257b of the motor from the exhaust or low pressure chambers 259a and 259b which are in communication with the exhaust outlets 267a and 267b, respectively.

The reciprocating gates 258a and 258b are cammed outwardly and inwardly in simple harmonic, reciprocating motion by the coaction of cam grooves 260a and 260b and following rollers 261 (see Fig. 13) in the same manner as has been more fully described for the reciprocating gates 97 and 98 of the air compressor. The cam grooves 260a and 260b are formed in the upper and lower surfaces, respectively, of the rim 256 of the air motor rotor, while each leg of the gates 258a and 258b is provided with a pair of ball bearing rollers 261 supported on a shaft or pin 262 threadedly secured in the leg. In this case, as in the case of the air compressor, the cam grooves are of shouldered or offset construction so that the inner roller of each pair (with respect to the bottom of the cam groove) rolls in pressure contact with the radially outer side of the cam groove, while the outer roller rolls on the inner side of the groove and in the opposite direction.

As shown in Figs. 18 and 19, each leg of the gates 258a and 258b is supported and guided for reciprocating movement by two pairs of ball bearing rollers 263 and 264, mounted on pins or spindles 263a and 264a threadedly secured to the top and bottom plates of the air motor housing, which rollers roll in grooves or rabbets 265a and 265b cut in the opposite side edges of the leg, in the same manner as previously described in connection with the gates of the air compressor. Pockets 266a and 266b are formed in the enlarged portions 186a and 186b of the air motor housing to receive the gates 258a and 258b as they reciprocate.

It will be observed from Fig. 18 that there are three projecting lobes or bulges 256a, 256b and 256c on the rim 256 of the air motor rotor, instead of two as in the case of the wheel 85 of the air compressor. The purpose of this is to prevent the air motor from ever being in the position of dead center, and to insure that it will promptly start revolving whenever subjected to air pressure.

During high speed rotation of the basket, when the clothes are being wrung or damp-dried by centrifugal action, the speed is held to a safe maximum by the air governor just described. For the low speed operation, during the major portions of the rinsing, washing and final drying steps, when the basket rotates at approximately 60 revolutions per minute or less, no governor is required, all of the regulation necessary being provided by causing the air to pass through the restricted orifice formed by the small annular groove 232 in the plunger 231 of the solenoid air valve (Fig. 16), the plunger 231 then being in its normal passage-closing position.

Since, as may be seen from the foregoing description, the compressed air motor is positive in action, with very small air leakage, it also tends to act as a vacuum pump when it is running faster than it would normally be driven by the volume of air which is supplied through the small orifice provided by the groove 232. This tendency is effectively utilized according to the invention to slow down or brake the spinning basket without the use of mechanical braking means.

Thus, when the motor is running at high speed during spinning action and the solenoid 226 is deenergized, the helical spring 223 immediately pushes the plunger 231 to its closed position, but the motor rotor continues to turn at high speed and to generate or displace a space within the motor of greater volume than that which the air supplied to it through the small orifice 232 would occupy at atmospheric pressure. As a result, the air inside the motor expands to fill the space thus generated or displaced, which causes the air pressure within the motor to drop below the atmospheric pressure outside the motor and tends to create a partial vacuum in the air supply lines 201 and 202 (Fig. 8) and in the inlet chambers 257a and 257b of the motor. As a result, the pressure in exhaust chambers 259a and 259b, which is approximately atmospheric, becomes greater than that existing in the inlet chambers and acts to resist rotation of the motor. The difference in air pressure thus produced acts as a powerful brake and immediately slows down the rotating basket until it reaches its normal slow speed, as determined by the volume of air being received through the orifice or groove 232. Since the air pressure provided by the air compressor is approximately uniform, the revolving basket quickly adjusts itself to a realtively constant slow speed. This form of braking action, utilizing only the soft smooth force of pneumatic pressure, is much superior to the harsh, wearing and vibration producing mechanical clutch action of other machines.

As is indicated by the arrow in Fig. 13, the basket rotates in a clockwise direction in the layout shown. With the same construction, the direction of rotation may be reversed by merely reversing the inlets and outlets of the air motor, an expedient which would permit oscillation or rotation of the basket in opposite directions, if desired. In the embodiment disclosed, however, the basket and air motor are intended to rotate in one direction only.

The exhaust air from the air motor flows out through the exhaust outlets 267a and 267b formed in the enlarged portions 186a and 186b of the air motor housing and thence up through the coinciding and cooperating exhaust passageways 268a and 268b which are formed in the enlarged portions 235a and 235b of the air motor cover plate. From the passageways 268a and 268b the air passes into the annular space 269 (Fig. 5) immediately above the air governor ring 262, thence upward through a large opening 270 (Figs. 4 and 26) in the main top frame casting 15 into the portion of the top casting in which the exhaust cut-off valve 35 and its operating solenoid are located, and finally downward into one of the exhaust conduits 214, 216 and 217 through which it escapes from the machine. It should be noted that the exhaust air from the air motor is not controlled by the cut-off valve 35, but has at all times free egress from the machine.

The upper or air motor rotor portion 37a of the rotating basket assembly is supported and held in true center position against all lateral movement by three ball bearing rollers 273 (Fig. 25) equidistantly spaced around the perimeter of the basket and each bearing against a flange 274 which extends downwardly from the rim 256 of the basket portion 37a. The locations of the lateral roller bearings 273 with respect to the perimeter of the flange 274 are indicated by the three section lines 25—25 in Fig. 18. Each roller bearing 273 is journaled on a vertical pin 275 which is threaded into the air motor housing 186.

The basket is also maintained in proper position vertically by suitable bearings associated with the upper basket portion 37a. As shown in Figs. 4 and 5, four upper roller bearings 276 are provided, journaled on horizontal pins 277 carried by the air motor cover plate 235, which roll in the bottom of the air motor cam groove 266a. These four rollers resist the upward thrust of the compressed air in the elbows 190, 192, etc., acting against the imperforate portions of the bottom of the basket and prevent lifting of the basket thereby. Two lower ball bearing rollers 278 are also provided (Fig. 4), journaled on horizontal pins 279 carried by the air motor housing 186. These two bearings, located diametrically opposite one another, engage the bottom of the rim 256 and support the weight of the basket when the compressor is not running and compressed air is not exerting an upward thrust against the bottom of the basket.

From the foregoing description, it is evident that the rotating basket is firmly and rotatably supported against lateral movement and in a true center position at both the upper and lower ends by the roller bearings 273 and the plastic or hard rubber water lubricated bearing 197, respectively, and is likewise firmly and rotatably secured against upward and downward movement by the bearing rollers 276 and 278.

By using non-corrosive material for the ball bearing rollers just described, and by permanently packing them with a water repellent lubricant, the machine may be used for an indefinite number of years without maintenance, appreciable wear or lubrication.

The cover plate 235 is secured to the air motor housing 186 by eight machine bolts 281 (Fig. 8). By merely removing these eight bolts, the cover plate 235, and then the entire basket 37, may be easily and quickly lifted out of the machine. This, however, will be necessary only for disassembly of the machine, or for repair or servicing of the compressed air motor.

The means by which water is supplied and its passage through the machine will now be described.

The machine is so constructed that it may be readily moved into place near a source of water, on the four rollers 225 which are pivotally secured to the cabinet bottom casting 125 (see Figs. 4, 5 and 6) and temporarily connected to hot and cold water pipes and to a means of waste disposal, such as a kitchen sink, a bath or laundry tub, or other plumbing fittings. If desired, however, the machine may be permanently connected or installed in any desired location.

For a temporary installation, the novel arrangement of drum and hose assemblies 282, 299 and 346 illustrated in Fig. 7 provides for quick and easy connection of the hot and cold water and waste liquid lines, respectively, of the machine to outside water and waste lines.

Referring first to the hot water drum and hose assembly 282, a hollow drum or reel 283 is rotatably mounted on a vertical shouldered spindle 285 the upper end of which is secured to the horizontal flange of a supporting bracket 284 by means of a nut 286, the bracket 284 being suitably mounted on the exterior of the tub supporting cylinder 194. The hot water line 287, which leads from the drum and hose assembly 282 in the right rear corner of the machine to the water temperature regulator located in the front directly behind the knob 4 (see Fig. 8), is connected to a rubber hose 295 wound on the drum 283 by means of a union nut 288, a nipple 289 and an elbow 290, all of which are fixed in position, and a rotatable or swivel joint the details of which are better illustrated in Fig. 20. As there shown, the upper end of the elbow 290 is provided with a union nut 291 which also receives the flanged end 293 of a "pig tail" fitting 292. Compressed packing 294 is disposed in the annular area between the upper end of the union 291 and the flange 293 on the end of the "pig tail" fitting 292. The other end of the fitting 292 fits into the lower end of the rubber hose 295 which extends into the interior of hollow drum 283 through a boss 296 in the lower portion thereof, and is secured thereto by suitable band clamps 297.

All of the hose 295 except the lower end which projects into the drum 283 through the boss 296 is normally wound about the drum, the upper end thereof being provided with a suitable enlargement and band clamps (not shown) for attachment to the end of a standard hot water faucet. The lower flange or rim of the drum 283 is provided with short projecting hand knobs 498 to facilitate winding or rolling of the hose back on the drum after use. By the novel arrangement thus described, 7 to 10 feet of hot water hose may be readily stored on the drum 283, of which only the length required to conveniently reach the hot water faucet need be unrolled when the machine is in use. When the drum rotates during winding or unwinding of the hose, the flanged end 293 of the "pig tail" fitting 292 will revolve within the coupling 291, while the compressed packing 294 maintains a watertight joint. When the hose 295 is connected to a source of hot water, the water flows through the unwound portion of the hose, then through spiral convolutions of the portion which remains wound around the drum, then through the "pig tail" fitting 292 and elbow 290, and finally into the hot water line 287 which leads to the water mixing and temperature regulating mechanism.

The cold water line 298 is served by the hose and drum assembly 299 which is identical in construction and operation to the hot water hose and drum assembly 282 just described.

The thermostatically controlled water mixer (see Fig. 10) comprises an outer cylindrical casting 300 having a closed lower end and an upper end closed by a nipple 301 threadedly secured thereto. Adjacent the lower end of the casting 300 are two rectangular inlets 302 and 303, only a portion of each of which is visible in Fig. 10, the inlet 302 affords an inlet for hot water while inlet 303 admits cold water. The inlets 302 and 303 are connected to the hot and cold water lines 287 and 298, respectively, by suitable fittings not shown in detail in the drawings. A double water proportioning piston 304 is disposed within the casting 300, the upper piston 304a controlling the hot water inlet 302, while the lower piston 304b controls the amount of cold water entering through the inlet 303. The pistons 304a and 304b are joined by the connecting neck 304c, and are provided with series of holes 305 and 306, respectively, which allow free passage of water vertically through the pistons.

A hollow cylindrical stem 304d is formed integrally with the pistons 304a and 304b, and extends upwardly therefrom to a flange 304e which also has a series of holes 307 to permit a vertical flow of water. The hollow cylindrical stem 304d encompasses a metal bellows 308 having a closed lower end 308a which engages the bottom of said hollow stem and an upper end which is brazed or otherwise suitably secured to the downwardly projecting neck 309a of an adjusting cylinder 309. The adjusting cylinder 309 likewise has a series of holes 310 to allow for the passage of water in a vertical direction.

The interior of the casting 300 above the adjusting cylinder 309 contains a double helical coil of fine copper tubing 314, one end of which is fixed in the axial bore 309b of the adjusting cylinder 309 and communicates therethrough with the interior of the bellows 308. The other end of coil 314 is fixed to and closed by a boss 309d on the upper surface of adjusting cylinder 309.

The adjusting cylinder 309 is slidably mounted in the cylindrical casting 300, and may be slid or adjusted in a vertical direction within certain limits by rotating a horizontal adjusting shaft 311 which extends outwardly of the casting 300 through packing 312 and packing gland 313. The shaft 311 is provided with a collar 311a which secures it against longitudinal motion, and has an outer end 311b which extends through the front wall 8 of the cabinet of the machine and is adapted to receive the water temperature adjusting knob 4 (Fig. 1). The inner end of the adjusting shaft 311 passes through a slot in the wall of adjusting cylinder 309 and is provided with an eccentrically positioned cylindrical tip or boss 311c the periphery of which engages the upper end of a centrally disposed boss 309c formed integrally with the cylinder 309.

The entire interior of the coiled tube 314, the passageway 309b and the metal bellows 308 is filled with a suitable thermally expansible liquid, such as oil. A compressed helical spring 315 is seated against a shoulder 300a formed inside the casting 300 and thrusts upwardly against the flange 304e of double piston 304. Since the oil is incompressible, the thrust of the spring 315 against the double piston 304 is also transmitted to the adjusting cylinder 309 and continually urges the latter upwardly to a position determined by engagement of the boss 309c with the tip 311c of the adjusting shaft 311.

To regulate the temperature of the water mixture, the knob or dial 4 is turned to "hot" or "cold," or to any desired point in between. Turning of the knob 4 rotates the adjusting shaft 311 and shifts the position of the eccentric tip 311c, which in turn adjusts the initial position of the adjusting cylinder 309 and double piston 304. Movement of the latter automatically varies the relative portions of the rectangular hot water inlet 302 and the cold water inlet 303 which are uncovered by the pistons 304a and 304b, respectively.

Hot and cold water flows into the casting 300 through inlets 302 and 303, up through the series of holes 305, 307 and 310 and around the oil filled copper coil 314. Since the volume of the interior of the coil 314 is constant and cannot change, when the warm water flows around the coil and the oil within expands due to the heat, the increased volume of oil flows through the passage 309b and into the bellows 308. The bellows 308 is also subjected to the temperature of the water mixture by virtue of the horizontal openings 304f in the wall of the stem 304d. Expansion of the oil in turn expands the metal bellows, compresses the spring 315 and slidably adjusts the double piston 304 downwardly to decrease the effective area of the hot water inlet 302 and increase that of the cold water inlet 303. If the mixture of water flowing up through the assembly becomes cooler, the oil shrinks in volume, the metal bellows contracts and the compressed spring 315 pushes the double piston assembly upwardly so as to increase the opening 302 to allow more hot water to enter and decrease the cold water opening 303.

The above described device provides a very sensitive, quick acting and accurate means of regulating the temperature of the inflowing water, which at the same time is constructed of relatively few parts and is economical and inexpensive to manufacture.

After passing up through the casting 300, the mixed and temperature regulated water flows out through the nipple 301 into the elbow 316 (Fig. 8), and thence through the union 317 into the water line solenoid valve 384.

The water line solenoid valve 384 is similar in construction to the other solenoid operated valves previously described. As shown in Fig. 14, it is provided with a generally cylindrical main valve casting 318 formed of a non-magnetic metal having a solenoid core portion 318a which is surrounded by the solenoid coil 319. An iron valve plunger 320 is slidably disposed within the solenoid core 318a and is normally held in closed position, across the water inlet 328, by a helical spring 321. An outer cylindrical casing 322 encompasses the solenoid coil 319, and together with an iron ring 323, which closes the open end of the casing, provides a complete magnetic circuit. A stopper nut 324 is threadedly secured in the outer end of the solenoid core 318a, gaskets 325 and 326 being provided between the end of the solenoid core 318a, the end wall of the casing 322 and the flange on the stopper nut 324 to render the valve watertight. Water surrounds the valve plunger 320 and the spring 321, but is confined within the solenoid core 318a by the stopper nut 324 and the gaskets 325 and 326. An axial hole 320a and an intersecting diametrical hole 320b are provided in the plunger 320 to prevent a pocket of water being caught between the outer end of the plunger and the stopper nut.

A frusto-conical stopper 327, of neoprene or other suitable material, is mounted on the right hand end of the plunger 320, surrounding the neck 320c, bearing against the shoulder 320d and secured in place by the upset end 320e of the neck 320c. This stopper normally seats against the frusto-conical portion 318b of the bore of the casting 318 and cuts off the flow of water entering through the inlet 328. When an electric current is passing through the solenoid coil 319, the electro-magnetic force pulls the plunger 320 to the left against the force of the spring 321, uncovers the inlet 328 and permits a free flow of water through the valve.

The main valve casting 318 of the water line valve is slightly different from the main valve castings previously described, in that the water outlet nipple 329, which carries the flow of water forward after it has passed through the valve, is threadedly secured to the casting 318 by the union nut 330 with its axis at right angles to that of the inlet 328, instead of in alignment therewith. This form of the main casting is employed in order to save space, since there is only a limited space available in the machine for this valve and its pipe connections.

From the nipple 329, which is threaded into a boss 235d formed integrally with the upwardly extending flange 235c of the air motor cover plate 235 (see Fig. 13), the water flows into a short pipe 330 which is also threaded into the boss 235d and extends radially inwardly across the upper edge of the portion 37a of the rotatable basket. The pipe 330 has an elbow 330a on the inner or lower end of which is affixed a sprinkler head 331 so designed as to provide a wide and evenly distributed flow of water into the tub 37. The portion of the pipe 330 which lies immediately above the upper edge of basket portion 37a is provided with a rectangular collar 332, of rubber or other suitable material, which fits in a corresponding opening (not shown) in the stationary, downwardly projecting flange 15a of the main top frame casting 15 (see Figs. 4 and 5). The bottom edge of collar 332 is also rabbeted, as shown in Fig. 13, to conform to the similarly shaped upper and lower edges of the basket portion 37a and flange 15a, respectively, which cooperate to form a relatively tight joint between the top of the rotating basket and the stationary top closure of the machine.

The water line solenoid valve 384 which controls the flow of water into the tub is automatically opened at the appropriate times in the cycle of operations by the electric control system hereinafter described, but is closed after each opening, when the proper amount of water has been admitted to the tub, by a float actuated mercury type switch, the details of which are illustrated in Fig. 28.

As shown, a vertically disposed float cylinder 349 is positioned exteriorly of the tub supporting cylinder 184 adjacent the left front corner of the machine, and is supported on the fixed tub structure 188, 189 by, and communicates with the interior thereof through a bottom pipe connection 350 and an upper nipple connection 351. The pipe 350 is provided with an elbow flange 350a at its outer end into which the bottom of cylinder 349 is threaded, and extends inwardly through the tub supporting cylinder 184 with its inner end threaded into a horizontally projecting boss 195b formed integrally with the drain casting 195. The upper connecting nipple 351 also extends through the wall of the tub supporting cylinder 184 with its inner end threadedly secured in an outwardly projecting boss 188a formed integrally with the cylindrical portion 188 of the fixed tub adjacent the upper end thereof, and communicates with the upper end of float cylinder 349 through a boss 349a to which the flanged end of the nipple is connected by a union nut 365.

The upper end of float cylinder 349 is closed by a suitable threaded cap 356 having a horizontally projecting arm 356a on which is pivotally mounted a mercury type switch 385 containing a pair of contacts 385a and 385b and a body of mercury in which said contacts are normally immersed. The contacts 385a and 385b are connected in series with the solenoid coil 319 of water line valve 384, as indicated in the wiring diagram of Fig. 22, later to be described. The switch 385 is adapted to be tilted to and from the closed position shown in Fig. 28 by the action of a float member 357 and a cooperating switch actuating rod 358, both of which are housed in cylinder 349.

The upper end of rod 358 extends through the cap 356 and is provided with a horizontally extending finger 358a (see Fig. 8, also) which engages a slotted arm 385c fixed to and extending outwardly from the switch 385 in a direction perpendicular to its pivotally mounted supporting arm 385d. The float 357, which may be in the form of a hollow copper cylinder, has a vertically extending axial bore 357a through which the switch actuating rod 358 passes freely without frictional contact with the wall of the float. The rod 358 is provided at its lower end, just above the bottom of elbow flange 350a, with a horizontally extending lower float stop 358b, and in its upper portion, just below the level of the boss 349a, with an upper float stop 358c, which stops define the limits of the movement of float 357 on rod 358.

When there is no water in the tub, the elements of the water cut-off switch assembly occupy the positions illustrated in Fig. 28. As water is supplied to the tub upon opening of the water line solenoid valve 304, water enters the float cylinder 349 from the tub through the bottom pipe connection 350 and rises therein to the same level as that of the water in the tub, due to the fact that the upper end of the cylinder 349 is connected by the nipple 351 to the interior of the tub at a point above the water line therein, thus equalizing the pressure in the upper end of the cylinder 349 with that in the upper portion of the tub. As the water rises in the cylinder 349, the float 357 moves upwardly until it engages the upper float stop 358b, whereupon the rod 358 is moved upwardly so as to tip the switch 385 to the left (as viewed in Fig. 28) and elevate the contacts 385a and 385b out of the mercury, thereby breaking the circuit through the solenoid coil 319 of the water line valve 304, permitting the latter to close under the influence of its spring 321 (Fig. 14), and shutting off the flow of water to the tub. When the tub is subsequently emptied by opening of the waste line valve, next to be described, the float 357 moves downwardly in the cylinder 349 as the water level drops until it engages the lower float stop 358b, whereupon the weight of the float is sufficient to move the rod 358 downwardly and again tilt the mercury switch 385 to the position shown in Fig. 28, wherein a circuit is reestablished between the contacts 385a and 385b.

When the proper times come in the cycle of operations, the waste liquid in the tub is discharged through the drain casting 195 and a solenoid operated waste line valve, the construction of which is similar to the solenoid valves previously described and is illustrated in Fig. 5.

In the form shown, the waste line valve comprises a valve core 333 of non-magnetic metal threadedly secured to a laterally projecting boss 195a on the drain casting 195 which is integral with the conical bottom 189 of the stationary tub. An iron valve plunger 334 is disposed within the core 333 and is provided with a frusto-conical stopper 335 attached to its inner end. The plunger 334 is also provided with an axial hole 334a and an intersecting diametrical hole 334b which prevent water from being caught between the conical outer end of the plunger 334 and its similarly shaped seat in the end stopper nut 336.

A solenoid coil 342 surrounds the core 333 and is housed in a flanged cylindrical casing 337 the open end of which is closed by a ring 338 to complete the magnetic circuit. Gaskets 339 and 340, which are compressed against the flanged end of the casing 337 and the outer end of the core 333 by tightening the stopper nut 336, make the solenoid valve water-tight.

The valve is normally held in a closed position by the action of a helical spring 341. When the solenoid 342 is energized, the valve is held open and the waste liquids from the tub may flow out the waste line 343 which, as shown in Fig. 4, is connected to the lower end of the drain casting 195 by an elbow coupling 343a.

The waste line 343 receives not only all of the waste liquid leaving the basket directly through the open lower end of the conical bottom portion 37c, but also that which, due either to hydrostatic pressure or centrifugal force, passes out of the rotating basket through the perforations 280 of the cylindrical central portion 37b and the air supply ports 190a, 192a, etc., into the space between the basket and the fixed tub structure 188, 189. Waste liquid in the latter space flows through openings 192 in the wall of the flange 205, which forms the outlet from the rotating baskets into the drain casting 195 and thence into waste line 343.

The waste line 343 extends outwardly through the tub supporting cylinder 184 and is connected by a union nut 345 to an elbow pipe 344 (see Fig. 7) which leads to the waste drum and hose assembly 346. Since the waste drum and hose assembly 346 is constructed in substantially the same manner as the hot and cold water drum and hose assemblies 282 and 299, with a similarly constructed rotating packed joint, it need not be described in detail. When in use, as much of the waste line hose as may be necessary is unrolled from the drum and the outer end placed up in a sink or at some other suitable location for disposing of the waste liquids. Opening of the waste line valve then permits the waste to flow through the line 343, elbow pipe 344 and the rotating packed joint of the drum assembly, around the helical convolutions of the hose remaining on the drum, and out the free end of the waste hose line, up to the sink or other disposal point.

As previously mentioned, removal of waste liquid is facilitated, and its discharge to a point above the level of the machine made possible, by the provision of novel means which, whenever the waste line valve is open, automatically cuts off the exhaust of air from the tub and builds up the air pressure therein so as to exert a super-atmospheric pressure on the surface of the water in the rotating basket. To this end, communication between the interior of the tub and the atmosphere through air exhaust conduits 20 and 22 is controlled by the exhaust air cut-off valve 35, said valve normally being open but being automatically moved to closed position by the solenoid 36 during those phases of the cycle of operation when the waste line valve is open.

In the form shown (see Figs. 4, 26 and 27), exhaust air cut-off valve 35 comprises a supporting plate 402, generally rectangular in outline, which is connected by a neck 403 with the plunger 271 of the solenoid 36 and is horizontally slidable by said plunger in grooves 405 formed in the lower end of the exhaust casting 22. The area of plate 402 is sufficient to completely block the lower end of exhaust casting 22 when the valve 35 is pulled to the left (as viewed in Fig. 26) by the solenoid 36.

Formed integrally with the plate 402, and extending downwardly from the periphery of a central opening therein, is a cylindrical boss 406 having an inturned flange 408 and a diametrically extending crossbar 407 at its lower end. The substantially semi-circular openings between the flange 408 and the crossbar 407 are normally closed by a disc 412 which seats against the bottom of boss 406. The disc 412 is provided with a stem 409 which extends upwardly through the crossbar 407 and has secured to its upper end another disc 411, the latter having sliding contact at its periphery with the interior of boss 406 and normally being held in a position just below the open upper end of said boss by a spring 410 seated on the flange 408. The disc 411 is perforated as indicated at 413 so as to continually subject the upper surface of disc 412 to the air pressure existing above plate 402.

Solenoid 36, which controls the exhaust air cut-off valve 35, is of the same general construction as the valve operating solenoids previously described, having an apertured plunger 271 of magnetizable metal slidably mounted in a non-magnetic core 272, the core being surrounded by a solenoid coil 401 and having its outer end closed by a stopper nut 404. A spring 431, interposed between the stopper nut 404 and a shoulder formed on the plunger 271, normally maintains the latter in its extreme right-hand position, illustrated in Fig. 26, in which the lower end of the exhaust conduit 22 is unobstructed by the cut-off valve 35. When electric current passes through the solenoid coil 401, the plunger 271 is magnetically pulled to the left against the spring 431, carrying with it the valve 35, the portion of the core 272 extending beyond the coil 401 being longitudinally slotted to permit the neck 403 of the valve to move with the plunger.

When the solenoid 36 is energized, the cut-off valve 35 is moved to a position wherein the plate 402 and the elements carried thereby underlie and close off the lower end of exhaust conduit 22. Although the air in conduit 22 may then pass through the openings 413 in disc 411, the spring 410 normally maintains the disc 412 in contact with the bottom of boss 406 and prevents the further downward passage of air. As a result, since the air compressor 80 forces air into the tub continually throughout the cycle of operations through the ports in the tub bottom, the air pressure in the tub builds up and exerts a super-atmospheric pressure on the water therewithin which effectively forces the waste liquid out of the machine and to a higher level, if necessary.

Should the air pressure built up in the tub while the cut-off valve 35 is closed exceed a predetermined or safe limit, established by the strength of the spring 410, the disc 412 will be moved downwardly, overcoming the force of the spring 410, and permit the escape of air through the then open bottom of boss 406 into whichever of the exhaust conduits 214, 216, 217 is open. The safety valve thus provided will remain open until such time as the pressure in the tub drops below the designed maximum, whereupon the disc 412 will again move upwardly and close the openings in the bottom of boss 406.

*The electrical control system*

As has been mentioned previously, the operation of the machine of the present invention is entirely automatic after the user has placed the clothes to be washed in the tub, filled the cups 38, 39, 40, 41 and 42 with whatever washing ingredients are to be employed, and set the dials 1, 2, 3 and 4 to indicate the number and length of washing operations desired, the desired length of the final drying step and the desired temperature of the water. Once the user has taken care of these preliminary matters, an automatic control system of novel character takes charge and directs the machine through the complete cycle of washing and drying operations without further intervention by the user.

The automatic control system, shown diagrammatically in Fig. 22, comprises three drum type controllers or switches 359, 360 and 361 which are so designed as to energize the air compressor motor 81 and air heating elements 136, 137 at all times during the cycle of operations, and to also close in proper sequence, but at selectively variable intervals, the circuits of the various solenoids which control the opening and closing of the ingredient cups, the water inlet valve, the waste line valve, the air exhaust cut-off valve, and the main air valve which controls the supply of air to the air motor.

Each of switches 359, 360 and 361 consists of a drum adapted to be rotated by a small electric motor and carrying a plurality of conductive segments or contacts on its surface, and a corresponding set of fixed contacts permanently wired into the circuits leading to the various electrically actuated elements of the machine which, when engaged by the movable contacts of the drum, energize said circuits from the usual source of house current to which the machine is adapted to be connected in the same manner as any household electrical appliance. Each of the switch drums is also manually adjustable so as to permit the user to select the desired lengths of washing and drying times, two of the three drums comprising a novel two-part construction which enables such adjustment without affecting the sequence or length of the other operations associated with the washing steps.

Referring now to Fig. 22, wherein the drum switches 359, 360 and 361 are shown in developed form and the rest of the electrical circuits of the machine are diagrammatically indicated, it will be seen that the switch 359, which controls the first washing step, comprises a two-part drum 447, 447a, the part 447 being fixed to and rotatable by a shaft 391 adapted to be driven by a small constant speed motor 362 through reduction gearing 363 and a friction clutch 392, while the part 447a is rotatably mounted on the shaft 391 and is driven by the part 447 through a second friction clutch 393. The drum parts 447 and 447a are also rotatable by the knob or dial 1 which is secured to a stub shaft 391a fixed to part 447 and extending outwardly through the front wall 8 of the cabinet. The friction clutches 392 and 393 are so designed that the former has a substantially greater torque transmitting capacity than the latter in order that the drum part 447 may be rotated relatively to the part 447a (through slipping of the clutch 393), by either the motor 362 or the knob or dial 1, whenever rotation of part 447a is prevented by engagement of one of a pair of lugs 394 and 396, which are fixed to the drum part 447a and extend outwardly therefrom at circumferentially spaced points, with a stop 395 fixedly mounted in any suitable manner in the path of the lugs 394 and 396.

Drum part 447a carries at predetermined points on its periphery three conductive segments or contacts 386, 388 and 396 which are electrically connected to one another and are adapted, when part 447a rotates, to make contact successively with fixed contacts 387, 389 and 397, respectively. The fixed contact 387 is permanently connected to the solenoid coil 319 of the water inlet valve 384, with which coil the float actuated mercury switch 335 is in series, while fixed contacts 389 and 397 are permanently connected to the solenoid coils 399 and 398 which control the bottoms of ingredient cups 38 and 39, respectively.

Drum part 447 is provided with a conductive segment or contact 370 which extends completely around its periphery except for a non-conductive insert 370a of relatively small circumferential extent, and is adapted to bridge a pair of fixed contacts 368—369 which are permanently connected in series with the drum rotating motor 362, the air compressor motor 81 and the air heating coils 136 and 137, across the main power supply conductors $L_1$ and $L_2$. The drum part 447 also carries at appropriate points on its periphery conductive segments or contacts 399, 414 and 372 which are electrically connected to one another and to segment 370, and are adapted to cooperate with fixed contacts 400, 415 and 373—374 in closing and opening certain other electrical circuits of the machine. Fixed contact 400, for example, is permanently wired into the circuits of both solenoid 342 of the waste line valve and solenoid 401 of the air exhaust cut-off valve 35, which solenoids are arranged in parallel with one another, while fixed contact 415 is connected to solenoid 226 of the main air valve 290 which controls the supply of air to the basket-driving air motor. The paired fixed contacts 373—374, which are adapted to be bridged by the drum segment 372, are positioned in the circuit of the drum rotating motor 364 of switch 360 for a purpose hereinafter described.

The main conductive segment 370 of drum part 447 is also electrically connected in any suitable manner with the segment 396 of drum part 447a so as to connect the latter and its associated contacts 386 and 388 with the conductor $L_2$ of the main supply line at all times other than when the drum part 447 occupies the position wherein the fixed contacts 368—369 are bridged by the non-conductive insert 370a.

The second switch 360, which controls the second washing period, two subsequent rinsing periods and the damp-drying step, is also provided with a two-part drum 448, 448a, a small constant speed motor 364 which drives the drum part 448 through reduction gearing 365, a friction clutch 449 and a shaft 450, a second friction clutch 451 through which the drum part 448a is driven by the part 448, a pair of lugs 424 and 425 and a fixed stop 423 which cooperate to limit the rotational movements of drum part 448a, and a stub shaft 450a which receives the knob or dial 2 for manual adjustment of drum 448, 448a, all directly comparable with the elements of switch 359 as above described.

The drum part 448a carries on its periphery at properly designed positions conductive segments or contacts 416, 418 and 420 which are electrically connected with one another and are adapted to cooperate with fixed contacts 417, 419 and 421, respectively, in closing and opening the electrical circuits of certain elements of the machine. Fixed contact 417, for example, is connected to the solenoid coil 319 of the water inlet valve, in parallel with fixed contact 387, while contacts 419 and 421 are connected to the coils 45 and 422 of the ingredient cups 40 and 41, respectively.

Drum part 448 is provided with a main energizing conductive segment 375 which extends entirely around the drum except for the non-conductive insert 375a and is adapted to bridge fixed contacts 376—377, the latter being in series with the drum rotating motor 364 and connecting one side thereof to the supply conductor $L_2$ through the fixed contacts 373—374 of switch 359 when the latter are bridged by drum segment 372 and when they themselves are bridged by segment 375. Drum part 448 also carries at appropriately selected positions on its periphery a plurality of conductive segments 427, 429, 432, 434, 436, 438, 440, 443 and 445 which cooperate with fixed contacts 428, 430, 433, 435, 437, 439, 441, 444 and 446, respectively, in controlling the various operations incident to the first and second rinsing steps and damp-drying step, and a segment 380 which is adapted to bridge fixed contacts 378—379 just before drum part 448 comes to rest at the end of its rotational cycle, for a purpose later to be described. As in the case of switch 359, all of the conductive segments of drum part 448 are electrically connected to one another, while the segment 375 is also connected to the segments 416, 418 and 420 of part 448a.

Fixed contacts 428, 435 and 444 are connected in parallel with one another and fixed contact 400 of switch 359 to the solenoid coils 342 and 401 of the waste line valve and air exhaust cut-off valve. Similarly, contacts 430, 437 and 446 are connected in parallel with contact 415 to the coil 226 of the air motor supply valve, contacts 433 and 439 lead in parallel with contacts 417 and 387 to the coil 319 of the water inlet valve, and contact 441 serves to energize the coil 442 of ingredient cup 42.

It will be understood that the relative positions and peripheral extents of the conductive segments of both drums 447, 447a and 448, 448a are so selected that the circuits to the various solenoids are energized in proper sequence, and remain energized for sufficient lengths of time, to carry out the desired series of operations which the machine is adapted to perform. It is also to be noted that, although the four pairs of fixed contacts 368—369, 373—374, 376—377 and 378—379 have been shown below their respective drums in order to avoid undue crowding of the lines in Fig. 22, the drums are there shown in developed form, with the result that these four sets of contacts are actually positioned in line with the other fixed contacts of their respective drums. Consequently, it will be understood that drum segments 372 and 380 bridge the fixed sets of contacts 373—374 and 378—379 just before contact is broken between segments 414 and 445 and contacts 415 and 446, respectively, and that fixed contacts 368—369 and 376—377 become bridged by the non-conductive inserts 370a and 375a (resulting in stopping of the drum driving motors 362 and 364) while fixed contacts 373—374 and 378—379 are still bridged by segments 372 and 380, respectively.

The third drum switch 361 differs from the other two in that it has only a single drum 454 which, in turn, has only a single conductive segment 381 extending entirely around its periphery except for the relatively narrow non-conductive insert 381a. The drum 454 is adapted to be driven by a small constant speed motor 366 through reduction gearing 367, a friction clutch 455 and shaft 456, and to be manually adjusted from the outside of the machine cabinet by the knob or dial 3 and stub shaft 456a. The segment 381 is adapted to electrically connect the fixed contacts 382—383 at all times other than when said contacts are bridged by the non-conductive insert 381a, the contacts 382—383 being adapted to connect one side of drum switch motor 366 to the conductor $L_2$ through the fixed contacts 378—379 of switch 360.

Since the three drum switch motors 362, 364 and 366 are connected in parallel with one another and in series with the air compressor motor 81 and air heating coils 136, 137, and since the motor 81 and coils 136, 137 are permanently connected to conductor $L_1$ of the main supply line, it will be seen that energization of said motor and heating coils and of the drum switch motors 362, 364 and 366 will depend upon the conductive bridging of either contacts 368—369, or contacts 373—374 and 376—377, or contacts 378—379 and 382—383. It will also be understood that, because the switch motors 362, 364 and 366 are small constant speed motors whose only load consists of the drum type controllers or switches 359, 360 and 361, their connection across the power line $L_1$ $L_2$ in series with the larger air compressor motor 81 requires that each of the switch motors be provided with a shunt resistor circuit across its terminals, as illustrated in Fig. 22, which so proportions the current flow across the line that only a relatively small amperage is delivered to each of said motors.

As shown, the circuits of the various solenoids controlled by switches 359 and 360 are permanently conected to conductor $L_1$ of the main supply line in parallel through a common lead 452. Should it be desired to use direct current through the solenoid coils, instead of alternating current, a rectifier 453 of any suitable type, such as a selenium rectifier, may be inserted in the lead 452. With this arrangement, the alternating current normally supplied by the usual household circuit will still flow through the air heating elements 136 and 137, the air compressor motor 81 and the drum switch motors 362, 364 and 366.

As indicated in Fig. 6, the three drum switches 359, 360 and 361 are mounted in suitable casings on a plate 457 which extends transversely across the front of the machine just inside of the sheet metal front 8 and just below the frame 79. The electrical circuits between the switches 359, 360 and 361 and those of the solenoids which are located in the top of the machine pass through the socket or knife type switch 139, which permits removal of the top sub-assembly without the necessity for any manual disconnection of the electrical conductors. All other details of the electric wiring of the machine, including a showing of the conventional cord and plug by which connection may be made to the house current, have been omitted from the drawings in the interest of simplicity.

The cycle of operations

The cycle of operations of the machine of the present invention may be varied by the user with respect to the number and duration of the washing steps, the number and character of the washing ingredients used, and the length and consequent degree of completeness of the final drying step. All other phases of the cycle are automatically carried out by the machine without intervention of the user once a selection has been made of the variable factors, the machine has been loaded with clothes and washing ingredients and has actually been started by manipulation of one or more of the control knobs or dials 1, 2 and 3. The user may also vary the temperature of the washing water by manipulation of knob 4.

In the following description of the operational cycle, it will be assumed that the machine has been properly connected to sources of hot and cold water and to a means of waste disposal by the drum and hose assemblies 282, 299 and 346, that one or more of the air exhaust conduits 214, 216 and 217 has been opened by the removal of its end cover plate and, if desired, the air discharge hose has been connected thereto so as to lead the exhaust air out of the room in which the machine is being used, and that the conductors $L_1$ and $L_2$ of the main electrical supply line of the machine have been energized by connection in the usual manner to a household lighting or power circuit.

The user first opens the lid 10 by means of the handle 11, in the manner previously described, and places the clothes or other material to be washed in the rotatable tub or basket 37 through the large central opening in the basket top portion 37a. The lid is then closed and the ingredient cups 38, 39, 40, 41 and 42 filled according to the number of washing operations desired and the desired character of washing ingredients to be used. Assuming that two washing operations are required, and that bluing or starch is to be used during the second rinsing step, suitable quantities of soap will be placed in cups 39 and 41, bluing or starch in cup 42 and water softener in cups 38 and 40, if necessary. The only remaining action required of the user is to adjust the dial 4 to indicate the proper temperature of the washing and rinsing water, and to adjust the dials 1, 2 and 3 so that they indicate the number of minutes desired for the first washing, second washing and final drying steps, respectively. Having carried out the above described procedure, all of which should require only about two minutes of the user's time, the user need do nothing more and may leave the machine unattended with the knowledge that it will automatically carry out, in proper sequence and timed relation, all of the steps of the complete cycle of washing and drying operations.

THE SETTING OF THE CONTROL DIALS

Referring now to the setting of the dials 1, 2 and 3 and to the operations resulting therefrom, it should first be noted that the positions of the drum switches 359, 360 and 361 illustrated in Fig. 22 represent the positions occupied by the various elements thereof immediately after they have been adjusted by the user when starting the machine. The solid arrows appearing on drum parts 447, 449 and 454 indicate the direction in which the drums are moved by the driving motors 362, 364 and 366, while the broken line arrows indicate the direction of movement of the drums brought about by adjustment of the dials 1, 2 and 3 away from their zero positions.

When the drums are in their zero positions, the lugs 396 and 424 are in engagement with stops 395 and 423, respectively, and the fixed contacts 368—369, 376—377 and 382—383 are bridged by their respective non-conductive inserts 370a, 375a and 381a, so that the circuits through the three drum switch motors 362, 364 and 366, the air compressor motor 81 and the air heating coils 136, 137 are broken, although the pairs of fixed contacts 373—374 and 378—379 are at the same time conductively bridged by the contact segments 372 and 380, respectively.

Rotation of dial 1 away from its zero position to one indicating the number of minutes desired for the first washing operation initially rotates both drum parts 447 and 447a in the direction of the broken line arrow until the lug 394 engages the stop 395, whereupon continued movement of the knob 1 rotates drum part 447 relatively to part 447a while the friction clutch 393 slips. The effect of this relative movement of drum part 447 with respect to part 447a is to vary the circumferential distance between drum segments 396 and 399, which distance represents the length of time that will elapse between the dumping into the basket of the soap contained in cup 39 and the opening of the waste line valve, i. e. the first washing or soaking interval. It will be noted that the circumferential intervals between drum segments 386, 388 and 396, and between segments 399, 414 and 372, are fixed, so that the operations controlled by these segments and their corresponding fixed contacts always occur in the same sequence and timed relationship.

The instant that knob 1 and drum part 447 are turned away from their zero position, fixed contacts 368—369 are bridged by the conductive segment 370, thereby closing the circuits from conductor L1 to conductor L2 through the air compressor motor 81, the air heating coils 136, 137 and drum switch motor 362, and starting the machine in operation.

As will be seen from the following description, the air compressor motor 81 and air heating coils 136, 137 remain energized throughout the cycle of operations until the drum 454 of switch 361 returns to its zero position, at which time the non-conductive insert 381a bridges the fixed contacts 382—383 and opens the circuits of said motor and coils. Accordingly, it will be understood that the motor 81 drives the compressor 80 continuously, forcing compressed air upwardly into the rotating basket and furnishing it to the basket driving air motor throughout the cycle of operations, and that at the same time coils 136, 137 heat the air and, with the aid of the air thermostat control mechanism contained in the housing 139, automatically maintain the temperature of the heated air within designed limits most suitable for efficient washing and drying operations.

It should also be noted that, while the initial adjustment of knob 1 and drum 447 automatically starts the air motor 81 and drum motor 362, drum motor 364 is not energized, even though knob 2 and drum parts 448 and 448a have been moved away from zero position, until the fixed contacts 373—374 of switch 359 are bridged by segment 372, just as the drum 447 returns to its zero position. Likewise, drum motor 366 of switch 361 does not become energized, in spite of the adjustment of knob 3 and drum 454, until fixed contacts 378—379 of switch 360 become bridged by segment 380 just before drum part 448 is returned to its zero position.

Adjustment of switch 360 by knob 2 to the desired time of the second washing operation similarly produces, first, a rotation of both drum parts 448 and 448a in the direction indicated by the broken line arrow until part 448a is brought to rest by engagement of lug 425 with stop 423, and, then, relative rotation of part 448 with respect to part 448a until the circumferential distance between segments 420 and 427 is such as to provide the desired interval for the second washing operation. As in the case of switch 359, the relative positions and circumferential extents of all of the other conductive drum segments of switch 360 are invariable.

Adjustment of switch 361 by knob 3 varies only the circumferential distance of non-conductive insert 381a from the position of fixed contacts 382—383, which in turn fixes the time of the final drying operation. As previously mentioned, this time may be so selected as to dry the clothes to any desired degree between damp-dry and complete dryness.

As will be seen from the diagram of Fig. 22. if the user desires to eliminate the first washing or soaking step in the cycle of operations, switch 359 is simply left in its zero position and switch 360 is adjusted to provide the desired length of time for a single washing operation. With switch 359 in zero position, adjustment of switch 360 will automatically start the machine in operation because fixed contacts 373—374 of switch 359 are bridged by the segment 372 when the latter switch is at rest, while initial movement of drum part 448 away from its zero position completes the circuit through fixed contacts 376—377, thereby energizing air compressor motor 81, air heating coils 136, 137 and drum motor 364.

Likewise, if it is desired to dry the clothes only to a damp-dry condition, the user simply leaves switch 361 at zero, in which case the machine automatically stops when switch 360 is returned to its zero position because of the break in the circuit between fixed contacts 382—383 which are bridged by the non-conductive insert 381a when switch 361 is left at zero.

Resuming now the description of the cycle of operations automatically carried out by the machine after setting of the dials of switches 359, 360 and 361, and again assuming that a full cycle is desired, including the first washing or soaking step, the sequence of operations is as follows:

THE FIRST WASHING OR SOAKING STEP

As soon as drum motor 362 has been energized by closing of the fixed contacts 368—369 through segment 370, said motor starts to turn both drum parts 447 and 447a in the direction of the solid line arrow in Fig. 22.

Contact is first made between segment 386 and fixed contact 387 which closes the circuit through solenoid coil 319 of water inlet valve 384, the mercury switch 385 then being in closed position due to the fact that, there being no water in the tub, the float 357 is at the bottom of cylinder 349, as shown in Fig. 28. Energization of solenoid coil 319 moves the plunger 320 of valve 384 to the left, as viewed in Fig. 14, and opens the water line 328, thereby permitting water to flow into the tub through the sprinkler head 331. When the water thus admitted to the tub or basket 37 reaches the desired level, the float 357, acting through the rod 358, tilts the mercury switch 385 so as to open the circuit through the contacts 385a, 385b and deenergize the solenoid coil 319. The water inlet valve 384 is then closed by the spring 321, and no more water enters the tub until the second washing period. The conductive segment 386 of drum part 447a is of sufficient circumferential length to allow more than enough time for the tub to fill with water under normal conditions, so that the supply of water is normally cut off by the action of float-actuated switch 385, rather than by movement of segment 386 out of contact with fixed contact 387.

During the time when the tub is being filled with water, the contents of the tub are being strongly agitated by the pulsating blasts of heated air which enter the bottom of the basket through the ports 190a, 192a, etc., every 45° of rotation of the basket, thereby insuring thorough wetting of the clothes during this initial period.

By the time that the tub has been filled with water, the motor 362 has rotated the drum part 447a sufficiently to bring segment 388 into contact with fixed contact 389, whereupon the solenoid coil 390 of ingredient cup 38 is energized and slides open the bottom 38a thereof, permitting the water softener for the first washing step to fall into the tub chamber 37. A few seconds later, segment 388 moves beyond contact 389, deenergizes the solenoid 390 and permits the spring corresponding to spring 55 of Fig. 4 to move the bottom 38a of ingredient cup 38 back to closed position.

A short interval of approximately one minute now occurs to allow the water softener to be mixed thoroughly with the water in the tub before segment 396 engages contact 397 and energizes solenoid coil 398 of ingredient cup 39 which contains the soap for the first washing or soaking step. As in the case of segment 388, segment 396 is of relatively small peripheral extent, so that the coil 398 retracts the bottom 39a of cup 39 for only a few seconds, just long enough to permit the soap in the cup to drop into the tub, whereupon coil 398 is deenergized and the bottom of the cup is closed by spring action.

After segment 396 moves beyond fixed contact 397, lug 396 of drum 447a engages stop 395 so as to prevent further rotation of drum part 447a. Drum motor 362 continues to rotate drum part 447, however, the friction clutch 393 slipping and clutch 392 of greater torque capacity continuing to drive drum part 447.

A variable time interval now elapses before the segment 399 engages fixed contact 400, the length of which interval is determined by the setting of the knob or dial 1. During this interval, as during all of the preceding time subsequent to starting of the machine, the basket 37 is slowly rotated at a speed approximating 60 revolutions per minute by the relatively small quantity of air which is passed to the basket driving air motor by the annular groove 232 formed in the end of the plunger 231 of the solenoid controlled air valve 200 (Fig. 16), and the clothes in the basket are vigorously agitated in the soapy water by the action of the heated air which is being forced into the tub through the ports in the bottom thereof.

When sufficient time has elapsed for the drum motor 362 to rotate the drum part 447 through the arc represented by the distance between segments 396 and 399, the latter segment engages the contact 400 and energizes both the solenoid coil 342 of the waste line valve and solenoid coil 401 of the air exhaust cut-off valve, whereupon the plunger 334 (Fig. 5) of the waste line valve is moved to the right so as to open communication between the drain casting 195 and waste line 343, while plunger 271 (Fig. 26) of air exhaust cut-off valve is pulled to the left and moves the valve 35 into position to close the lower or outlet end of the exhaust conduit 22 and prevent the further escape of air from the interior of the tub 37. The dirty water then flows out of the tub through the waste line 343, assisted by the air pressure which, due to closure of the valve 35, builds up in the tub 37 and exerts a super-atmospheric pressure on the waste liquid sufficient to positively discharge it from the machine and, if necessary, force it to a higher level than that of the machine. The segment 399 is of such length as to maintain the waste line valve open and the air exhaust cut-off valve closed for a sufficient length of time to insure emptying of all waste liquid from the tub.

During the latter half of the time when segment 399 is in contact with fixed contact 400, the segment 414 engages fixed contact 415 and closes the circuit which energizes the solenoid coil 226 of air valve 209, thereby retracting the valve plunger 231 to the position shown in Fig. 16 and enabling the maximum flow of air to the basket driving air motor. The basket 37 is then driven at high speed (800–1200 revolutions per minute), automatically controlled by the air governor valves 203 and 204, and extracts from the clothes by centrifugal force most of the waste, soapy water of the first washing step entrained therein, the extracted liquid passing out of the basket through the perforations 280 in the cylindrical central basket portion 37b, flowing down between the rotatable and fixed tub structures through the openings 192 (Figs. 4 and 5) into the drain casting 195, and thence through the still open waste line valve into the waste line 343. The length of segment 414 is so designed as to provide an adequate period of high speed centrifugal extraction at the end of the first washing step, and to break contact with fixed contact 415 simultaneously with the breaking of contact between segment 399 and its associated fixed contact 400, thereby producing simultaneous closing of the waste line valve, reopening of the air exhaust cut-off valve and return of the plunger 231 of the air valve 209 to the position in which the supply of air to the air motor is reduced to that which is passed by the annular groove 232. The rotating basket 237 is thereupon properly decelerated in the manner previously described, and resumes its normal slow speed of rotation for the second washing step.

THE SECOND WASHING STEP

The second washing step is controlled by the switch 360, the duration of said step being determined by the setting of the dial 2 which varies the circumferential or arcuate distance between the drum segments 429 and 427.

Just prior to the time when the segments 399 and 414 of drum 447 break contact with fixed contacts 400 and 415, immediately after which the non-conductive insert 370a of segment 370 bridges fixed contacts 368—369 and opens the circuit of motor 362 so as to bring the drum 447 to rest, the segment 372 bridges fixed contacts 373—374 and closes the circuit of drum motor 364 (the fixed contacts 376—377 being already bridged by conductive segment 375), thereby starting rotation of drum parts 448 and 448a in the direction of the solid line arrow.

The initial period of rotation of drum parts 448 and 448a effect successive closing of the circuits controlled by the drum segments 416, 418 and 420 and fixed contacts 417, 419 and 421 which cause the tub to be again filled with water, and the water softener and soap contained in ingredient cups 40 and 41 to be dumped into the tub, in precisely the same manner as has already been described in connection with the operations controlled by segments 386, 388 and 396 of drum part 447a. Likewise, after breaking of the contact between segment 420 and fixed contact 421, drum part 448a is brought to rest by engagement of lug 424 with stop 423, whereafter drum part 448 continues to rotate relatively to part 448a with slipping of clutch 451.

After the pre-selected time for the second washing step has elapsed, engagement of drum segment 427 with fixed contact 428 again energizes the solenoid coils 342 and 401 of the waste line valve and air exhaust cut-off valve so as to drain the tub of the waste liquid of the second washing step and, with the help of the increased air pressure within the tub due to the closing of the air exhaust cut-off valve, to force said liquid out of the machine, in the same manner as described for the first washing step. Drum 448 is also provided with a segment 429 which, upon contact with fixed contact 430, energizes solenoid coil 226 of air valve 200 and thereby produces a period of high speed rotation of the basket 37 for the purpose of extracting from the clothes by centrifugal action substantially all of the entrained waste liquid of the second washing step. Contact between segments 429 and fixed contact 430 is broken simultaneously with that between segment 427 and contact 428, just as in the case of segments 399 and 414 of switch 359, and with the same result of reclosing of the waste line valve, reopening of the air exhaust cut-off valve and return of the main air valve to the position in which the air motor receives only sufficient air to drive it at its normal slow speed of rotation.

THE FIRST RINSING STEP

After the tub has been emptied of the waste liquid of the second washing step and the basket has resumed its normal slow speed of rotation, drum part 448 brings segments 432, 434 and 436 successively into contact with fixed contacts 433, 435 and 437, respectively, to control the operations of the first rinsing step, which step is of a pre-designed, invariable length.

Engagement of drum segment 432 with fixed contact 433 energizes the solenoid coil 319 of the water inlet valve and permits the tub to be filled with water, the inflow of water being automatically cut off by the float-actuated valve 385, in the same manner as previously described. After the tub has been filled, a fixed period of time elapses, represented by the circumferential distance between drum segments 432 and 434, during which the entry of air into the basket through the ports in the bottom thereof vigorously agitates the mixture of clothes and water, and gives the clothes a thorough rinsing.

At the end of this predetermined rinsing time, drum segment 434 contacts the fixed contact 435, energizes the solenoid coils 342 and 401 of the waste line and air exhaust cut-off valves, and thereby effects discharge of the first rinsing water from the machine in the same manner as twice previously accomplished by drum segments 399 and 427. During the latter half of the time of engagement between segment 434 and contact 435, segment 436 engages contact 437, closes the circuit of the solenoid coil 226 of the main air valve, and provides a short period of high speed centrifugal extraction of the first rinsing water, just as the first and second washing waters were extracted under the control of drum segments 414 and 429. Segments 434 and 436 break contact simultaneously with contacts 435 and 437 at the end of the first rinsing step, whereupon the rotating basket again slows down to its normal slow speed in preparation for the second rinsing and damp-drying step.

SECOND RINSING AND DAMP-DRYING STEP

The second rinsing operation, like the first one, is of predetermined, fixed duration, established by the relative circumferential positions of the drum segments 438 and 443, but differs from the first rinse in that provision is made for the addition to the second rinsing water of starch or bluing, if desired.

As shown, the drum segments 438, 443 and 445 control, in cooperation with fixed contacts 439, 444, and 446, the same sequence of operations as those controlled by segments 432, 434, and 436 which are associated with the first rinsing step; i. e., filling of the tub with rinsing water, slow rotation of the tube with agitation of the clothes and water after filling, opening of the waste line valve and closing of the air exhaust cut-off valve to effect discharge of the waste liquid from the tube, and high speed rotation of the basket during the latter part of the waste discharge period for purposes of centrifugal extraction of the water from the clothes. In addition, however, just after the tub has been filled with the second rinsing water, the drum segment 440 engages fixed contact 441 and energizes the solenoid coil 442 of ingredient cup 42 so as to drop the contents thereof, which may be either bluing or starch, as desired, into the tub 37.

The second rinsing step also differs from the first in that it is combined with the wringing or damp-drying step, which is also of predetermined, invariable length. This wringing or damp-drying operation is controlled by segments 443 and 445 and fixed contacts 444 and 446, and is comparable to the waste discharge and extraction portion of the first rinsing step except that, as shown in Fig. 22, the segments 443 and 445 are longer than segments 434 and 436 so as to extend the period of high speed centrifugal extraction sufficiently to insure the maximum drying of the clothes practicably obtainable by this method.

The second rinsing and damp-drying step is terminated by simultaneous breaking of contact between segments 443 and 445 and fixed contacts 444 and 446, followed by movement of the non-conductive insert 375a across the fixed contacts 376—377, which breaks the circuit through drum motor 364 and brings the drum 448 to rest.

THE FINAL DRYING STEP

The final drying step, the duration of which may be varied by the user to provide any degree of dryness desired, up to and including complete dryness, is controlled by switch 361, the drum 454 of which is manually adjustable by the knob or dial 3 to the desired drying time and automatically returned to its zero position by drum motor 366.

Motor 366 is not energized, however, until just before switch 360 is returned to its zero position by drum motor 364, at which time segment 380 on drum part 448 bridges fixed contacts 378—379 and completes the otherwise closed circuit through motor 366, air compressor motor 81 and air heating elements 136, 137.

Since the drum 454 of switch 361 carries only a single circumferential conductive segment 381, the sole purpose of which is to energize the drum motor 366, air compressor motor 81 and air heating coils 136, 137, and since at the time of energization of the latter circuit none of the other electrically operated elements of the machine are energized, the period during which drum 454 is rotated by motor 366 back to its zero position produces only continued slow rotation of the basket 37 and the forcing of heated air upward into the basket through the ports in the bottom thereof. The slow turning of the basket, however, coupled with the agitation of the clothes therein by the relatively strong blasts of heated air which enter the basket every 45° of its rotation, produce a highly effective drying action which, by proper setting of the dial 3, may be continued for a sufficient period of time to insure complete drying, if desired.

When the drum 454 is rotated back to its zero position by the motor 366, the fixed contacts 382—383 are bridged by non-conducting insert 381a, whereupon the circuit between conductors L1 and L2 is broken, current supply to all parts of the machine is cut off, and the machine stops.

There is thus provided by the present invention a combination washing machine and drier, particularly adapted for domestic use, which is novel in both structure and method of operation, and is adapted to carry out in a completely automatic manner a cycle of washing and drying operations which may be selectively varied in certain important respects to suit the desires of the user of the machine. The machine is unique in the fewness of its moving parts, in the mutliple use of compressed air for driving the rotating basket, for agitating the contents of the basket during washing and for drying the clothes after they have been washed and damp-dried by centrifugal action, and in the control system which enables the user to vary both the number and duration of various steps in the cycle of operation, as desired. Included in the machine are various component parts or sub-assemblies which are themselves of novel construction and may find utility in other environments than that in which they are herein disclosed. For example, it should be obvious that such elements of the present machine as the specific type of solenoid valve employed for controlling the flow of water or air, the particular form of governor controlled valve for regulating the speed of the air motor and the thermostatic control mechanisms of the air heating means and the water mixer, are all susceptible of use in other combinations.

It should also be obvious that, while only one specific form of machine has been described and illustrated in the accompanying drawings, the invention is not limited to the particular apparatus shown, but is capable of a variety of mechanical embodiments. In particular, it will be apparent that the construction of each of the various sub-combinations of the machine may be varied by substituting equivalent mechanisms for those illustrated without materially affecting the overall result. For example, the specific forms of air compressor and air motor embodied in the present machine, which are also disclosed and claimed per se in co-pending application Serial No. 584,293, filed March 23, 1945, may be replaced by other suitable types of compressors and motors, although the structures shown are, as hereinbefore mentioned, particularly well suited for use in a washing machine of the present character because of their symmetrical construction and vibrationless operation.

Various other changes, which will now suggest themselves to those skilled in the art, may be made in the form, details of construction and arrangement of parts without departing from the spirit of the invention. Reference is therefore to be had to the appended claims for a definition of the limits of the invention.

What is claimed is:

1. A combination washing machine and drier adapted to automatically carry out a cycle of washing and drying operations comprising a rotatable container for the articles to be washed and dried having a plurality of openings in the bottom thereof, means for supplying washing liquid to said container, means for discharging waste liquid from said container, an air compressor, an air driven motor having permanently open communication with the outlet of said compressor for continuously rotating said container throughout the cycle of operations of the machine, a permanently open conduit extending from the outlet of said compressor to said container for introducing air into said container in intermittent blasts through said openings in the bottom thereof as said container rotates to agitate the contents thereof throughout the cycle of operations, whereby the air is utilized both for agitating the articles and washing liquid during the washing operations and for drying the articles after the last washing operation, and means for automatically controlling operation of said liquid supply and waste discharge means so as to render them operative at predetermined times in the cycle of operations.

2. A combination washing machine and drier adapted to automatically carry out a cycle of washing and drying operations comprising a rotatable container for the articles to be washed and dried, having a plurality of openings in the bottom thereof means for supplying washing liquid to said container, means for discharging waste liquid from said container, an air compressor, an air driven motor for rotating said container, a conduit connecting the outlet of said compressor to the inlet of said motor, a valve in said conduit for controlling the amount of air supplied to said motor by said compressor, said valve being so constructed and arranged as to pass at least a relatively small amount of air to said motor at all times so as to continuously rotate said container throughout the cycle of operations of the machine, means for adjusting said valve to increase the amount of air supplied to motor so as to rotate said container at a relatively higher speed than normal during certain periods in the cycle of operations, a fixed wall beneath and closely adjacent the bottom of said container, a conduit having permanently open communication with the outlet of said compressor and opening through said fixed wall for introducing air into said container in intermittent blasts through said openings in the bottom thereof as said container rotates to agitate the contents thereof throughout the cycle of operations, whereby the air is utilized for agitating the articles and washing liquid during the washing operations and for drying the articles after the last washing operation, and means for automatically controlling the operation of said liquid supply and waste discharge means and the means for increasing the amount of air supplied to the motor so as to render them operative at predetermined times in the cycle of operations.

3. A combination washing machine and drier adapted to automatically carry out a cycle of washing and drying operations comprising a rotatable container for the articles to be washed and dried, means for supplying washing liquid to said container, means for discharging waste liquid from said container, air operated means for continuously rotating said container throughout the cycle of operations of the machine, means for increasing the amount of air supplied to said last named means so as to rotate said container at a relatively higher speed than normal during certain periods in the cycle of operations, a governor device operable to limit the speed of rotation of said container during said periods of relatively high speed operation, means for forcing air into said container to agitate the contents thereof throughout the cycle of operations, whereby the air is utilized for agitating the articles and washing liquid during the washing operations and for drying the articles after the last washing operation, and means for automatically controlling the operation of said liquid supply and waste discharge means and the means for increasing the amount of air supplied to the air operated means so as to render them operative at predetermined times in the cycle of operations 4. A combination washing machine and drier adapted to automatically carry out a cycle of washing and drying operations comprising a rotatable container for the articles to be washed and dried, means for supplying washing liquid to said container, means for discharging waste liquid from said container, air operated means for continuously rotating said container throughout the cycle of operations of the machine, a valve controlling the amount of air supplied to said last named means, said valve normally passing only a relatively small amount of air to said air operated means so as to rotate said container at a relatively low speed, means for opening said valve to pass a relatively greater amount of air to said air operated means and thereby rotate said container at a relatively higher speed than normal during certain periods in the cycle of operations, means for forcing air into said container to agitate the contents thereof throughout the cycle of operations, whereby the air is utilized both for agitating the articles and washing liquid during the washing operations and for drying the articles after the last washing operation, and means for automatically controlling the operation of said liquid supply and waste discharge means and said valve opening means so as to render them operative at predetermined times in the cycle of operations.

5. A combination washing machine and drier adapted to automatically carry out a cycle of washing and drying operations comprising a rotatable container for the articles to be washed and dried, means for supplying washing liquid to said container, means for discharging waste liquid from said container, air operated means for continuously rotating said container throughout the cycle of operations of the machine, a valve controlling the amount of air supplied to said last named means, said valve normally passing only a relatively small amount of air to said air operated means so as to rotate said container at a relatively low speed, means for opening said valve to pass a relatively greater amount of air to said air operated means and thereby rotate said container at a relatively higher speed than normal during certain periods in the cycle of operations, a second valve interposed in the air supply line between said first named valve and said air operated means, means responsive to the speed of rotation of said container for controlling said second valve, means for forcing air into said container to agitate the contents thereof throughout the cycle of operations, and means for automatically controlling the operation of said liquid supply and waste discharge means and said valve opening means so as to render them operative at predetermined times in the cycle of operations.

6. A combination washing machine and drier adapted to automatically carry out a cycle of washing and drying operations comprising a rotatable container for the articles to be washed and dried, an air compressor, air operated means having permanently open communication with the outlet of said compressor for rotating said container, automatically controllable means for supplying variable quantities of air from said compressor to said last named means so as to rotate said container at different speeds at different times during the cycle of operations of the machine, and means for forcing additional quantities of air into the rotating container through the bottom thereof in intermittent blasts throughout the cycle of operations, including a plurality of ports in the bottom of said container located at different distances from the axis of rotation thereof, a conduit having permanently open communication with the outlet of said compressor and terminating adjacent the bottom of said container, and a plurality of air supply pipes connected to said conduit and adapted to register with said ports in the bottom of said container as the container rotates.

7. A combination washing machine and drier adapted to automatically carry out a cycle of washing and drying operations comprising a rotatable container for the articles to be washed and dried, valve controlled means for supplying washing liquid to said container, valve controlled means for discharging waste liquid from said container, an air compressor, an air driven motor for rotating said container, a conduit connecting the outlet of said compressor to the inlet of said motor, a valve in said conduit for controlling the amount of air supplied to said motor by said compressor, said valve being so constructed and arranged as to pass at least a relatively small amount of air to said motor at all times, means for adjusting said valve to vary the amount of air supplied to said motor so as to rotate said container at different speeds at different times during the cycle of operations of the machine, means for forcing additional quantities of air into the rotating container through the bottom thereof in intermittent blasts throughout the cycle of operations, including a plurality of ports in the bottom of said container located at different distances from the axis of rotation thereof and a plurality of conduits having permanently open communication with the outlet of said compressor and terminating closely adjacent the bottom of said container so as to register with said openings as the container rotates, and means for automatically varying the positions of the valves controlling the washing liquid supply means, waste discharge means and air supply to said motor at predetermined times in the cycle of operations.

8. A combination washing machine and drier according to claim 6, including means interposed in said conduit and operable at least during the drying operation for heating said additional quantities of air before entry thereof into said container.

9. A combination washing machine and drier adapted to automatically carry out a cycle of washing and drying operations comprising a rotatable container for the articles to be washed and dried, air operated means for rotating said container, means for supplying variable quantities of air to said last named means so as to rotate said container at different speeds at different times during the cycle of operations of the machine, means for forcing additional quantities of air into the rotating container through the bottom thereof in intermittent blasts throughout the cycle of operations, a plurality of conduits for leading the exhaust air from said air operated means and said container to different points on the outside of the machine, and means for selectively closing said conduits so that the exhaust air leaves the machine at one or more locations selected by the user.

10. A combination washing machine and drier adapted to automatically carry out a cycle of washing and drying operations comprising a rotatable container for the articles to be washed and dried, means for supplying washing liquid to said container, valve controlled means for discharging waste liquid from said container, air operated means for rotating said container, means for supplying variable quantities of air to said last named means so as to rotate said container at different speeds at different times during the cycle of operations of the machine, means for forcing additional quantities of air into the rotating container through the bottom thereof in intermittent blasts throughout the cycle of operations, an exhaust conduit for leading the air thus supplied to the container from the latter to the atmosphere, a valve controlling the flow of air through said conduit, and means for automatically closing said valve whenever the valve controlling said waste discharge means is open so as to increase the air pressure within said container and thereby assist in the discharge of waste therefrom.

11. A combination washing machine and drier adapted to automatically carry out a cycle of washing and drying operations comprising a rotatable container for the articles to be washed and dried, means for supplying washing liquid to said container, valve controlled means for discharging waste liquid from said container, air operated means for rotating said container, means for supplying variable quantities of air to said last named means so as to rotate said container at different speeds at different times during the cycle of operations of the machine, means for forcing additional quantities of air into the rotating container through the bottom thereof in intermittent blasts throughout the cycle of operations, an exhaust conduit for leading the air thus supplied to the container from the latter to the atmosphere, a valve controlling the flow of air through said conduit, means for automatically closing said valve whenever the valve controlling said waste discharge means is open so as to increase the air pressure within said container and thereby assist in the discharge of waste therefrom, a lid forming a substantially airtight closure for the upper end of said container, means for opening said lid to enable placing of articles in or removal of articles from said container, and means for locking said lid in closed position when said air exhaust conduit valve is closed.

12. A combination washing machine and drier adapted to automatically carry out a cycle of washing and drying operations comprising a rotatable container for the articles to be washed and dried, means for supplying washing liquid to said container, valve controlled means for discharging waste liquid from said container, air operated means for rotating said container, means for supplying variable quantities of air to said last named means so as to rotate said container at different speeds at different times during the cycle of operations of the machine, means for forcing additional quantities of air into the rotating container through the bottom thereof in intermittent blasts throughout the cycle of operations, an exhaust conduit for leading the air thus supplied to the container from the latter to the atmosphere, a valve controlling the flow of air through said conduit, means for automatically closing said valve whenever the valve controlling said waste discharge means is open so as to increase the air pressure within said container and thereby assist in the discharge of waste therefrom, a lid forming a substantially airtight closure for the upper end of said container, means for opening said lid to enable placing of articles in or removal of articles from said container, and means responsive to the air pressure in said container for automatically locking said lid in closed position whenever said air pressure increases above a predetermined value.

13. In a washing machine of the type adapted to automatically carry out a cycle of washing operations, a container for the articles to be washed, means for supplying washing liquid to said container, means for discharging waste from said container, means for automatically controlling the operations of said liquid supply and waste discharge means so as to render them operative at predetermined times in the cycle of operations of the machine, means for forcing air into said container to agitate the contents thereof throughout the cycle of operations, an exhaust conduit for leading the air thus supplied to the container from the latter to the atmosphere, and means for automatically cutting off the flow of air through said exhaust conduit whenever said waste discharge means is operative so as to increase the air pressure within said container and thereby enable the discharge of waste therefrom to a level higher than that of the container.

14. In a washing machine of the type adapted to automatically carry out a cycle of washing operations, a container for the articles to be washed, means including a solenoid operated valve for supplying washing liquid to said container, means including a second solenoid operated valve for discharging waste from said container, means for automatically energizing the circuits of said first and second solenoid operated valves at predetermined times in the cycle of operations of the machine, means for forcing air into said container to agitate the contents thereof throughout the cycle of operations, an exhaust conduit for leading the air thus supplied to the container from the latter to the atmosphere, a third solenoid operated valve controlling the flow of air through said exhaust conduit, and means for energizing the circuit of said last named valve simultaneously with that of said second named valve.

15. A washing machine and drier adapted to automatically carry out a cycle of washing and drying operations comprising a container for the articles to be washed and dried, means for supplying washing liquid to said container, means for discharging waste from said container, means for forcing air into said container to agitate the contents thereof throughout the cycle of operations of the machine, whereby the air is utilized both for agitating the articles and washing liquid during the washing operations and for drying the articles after the last washing operation, and means for automatically controlling the operation of said liquid supply and waste discharge means so as to render each of them operative at a plurality of different times during the cycle of operations, said control means being manually adjustable to independently vary at least two of the intervals between successive operations of said supply and discharge means and thereby vary the lengths of the corresponding washing operations, and to also independently vary the interval between the last operation of said waste discharge means and the end of the cycle, thereby varying the length of the final drying operation.

16. In a washing machine of the character described, a fixed tub, a container for the articles to be washed rotatably mounted in said tub, means for supplying washing liquid to said container, means for discharging waste from said container, a plurality of ports in the bottom of said container adapted to admit air into the latter, a corresponding plurality of air supply pipes extending upwardly through the bottom of the fixed tub, bearing means supporting said container for rotation with its bottom surface substantially in contact with the upper ends of said air supply pipes, and means for supplying air under pressure to said pipes, said air ports and air supply pipes being so arranged as to register with one another at regular intervals during rotation of the container and thereby deliver relatively strong, intermittent blasts of air upwardly into the container.

17. In a washing machine of the character described, a fixed tub, a container for the articles to be washed rotatably mounted in said tub, means for supplying washing liquid to said container, means for discharging waste from said container, a plurality of ports in the bottom of said container adapted to admit air into the latter, said ports being arranged in pairs with the ports of each pair diametrically opposite one another and equidistant from the axis of rotation of said container, but lying on a different diameter and at a different distance from said axis than the ports of each other pair, a corresponding plurality of pairs of air supply pipes extending upwardly through the bottom of the fixed tub with their upper ends substantially in contact with the bottom of the rotatable container, said pairs of air supply pipes being located at the same distances from the axis of rotation of the container as the corresponding air ports, but all lying on the same diameter through said axis, and means for supplying air under pressure to said pipes.

18. A washing machine according to claim 17 wherein said air supply pipes are so constructed and arranged that the direction of flow of the air issuing from each pipe is at an angle to the vertical, alternate pairs discharging at angles toward and away from, respectively, the axis of rotation of said container.

19. A washing machine according to claim 17 wherein said air supply pipes are so constructed and arranged that the direction of flow of the air issuing from each pipe is at an angle to the vertical, alternate pairs discharging in opposite directions relatively to the axial plane through the common diameter on which said pipes lie.

20. In a washing machine of the character described, a fixed tub, a container for the articles to be washed rotatably mounted in said tub, said container having a perforated cylindrical body portion and a conical bottom, an air motor for rotating said container having a casing fixed relatively to said tub and a rotor mounted on the cylindrical body portion of said container, a plurality of ports in the conical bottom of said container adapted to admit air to the latter, a corresponding plurality of supply pipes extending upwardly through the bottom of the fixed tub, bearing means associated with said air motor supporting said container for rotation with its conical bottom surface substantially in contact with the upper ends of said air supply pipes, and an air compressor for supplying air under pressure to both said air motor and said pipes, said air ports and air supply pipes being so arranged as to register with one another at regular intervals during rotation of the container and thereby deliver relatively strong, intermittent blasts of air upwardly into the container.

21. In a washing machine of the character described, a casing including a normally fixed top, a container for the articles to be washed rotatably mounted within said casing, a lid pivotally mounted on said top and normally forming an air-tight closure for the upper end of said container, means for opening said lid to enable placing of articles in or removal of articles from said container, means for forcing air into said container to agitate the contents thereof, a conduit for leading the air thus supplied to the container from the latter to the atmosphere including a pair of telescoping parts carried by the lid and top, respectively, a valve carried by the top for shutting off the flow of air through said conduit and thereby increasing the air pressure within said container to assist in the discharge of waste therefrom, and means carried by said lid responsive to the air pressure in said container for automatically locking said lid in closed position whenever said air pressure increases above a predetermined value.

22. In a washing machine of the character described, a casing including a normally fixed top, a container for the articles to be washed rotatably mounted within said casing, a lid pivotally mounted on said top and normally forming an air-tight closure for the upper end of said container, means for opening said lid to enable placing of articles in or removal of articles from said container, means for forcing air into said container to agitate the contents thereof, a conduit for leading the air thus supplied to the container from the latter to the atmosphere, a valve for controlling the flow of air through said conduit, and means for automatically locking said lid in closed position when said valve is closed.

23. A washing machine of the character described in claim 22 including air operated means for rotating said container, and continuously open conduit means for leading the air exhausted from said air operated means to the atmosphere.

CLEBURNE B. HATFIELD.

(References on following page)

REFERENCES CITED

The following references are of record in the file of this patent:

UNITED STATES PATENTS

| Number | Name | Date |
|---|---|---|
| 974,591 | Patterson | Nov. 1, 1910 |
| 1,528,180 | Ball | Mar. 3, 1925 |
| 1,891,842 | Schmid | Dec. 20, 1932 |
| 2,063,843 | Jensen | Dec. 8, 1936 |
| 2,165,523 | Wolf | July 11, 1939 |
| 2,296,266 | Breckenridge | Sept. 22, 1942 |
| 2,312,950 | Zimarick | Mar. 2, 1943 |
| 2,372,853 | Ray | Apr. 13, 1945 |
| 2,374,590 | Dunham | Apr. 24, 1945 |
| 2,394,142 | Breckenridge | Feb. 5, 1946 |
| 2,407,660 | Graham | Sept. 17, 1946 |
| 2,407,982 | Hanna | Sept. 24, 1946 |